(12) United States Patent
Venkataraman et al.

(10) Patent No.: US 12,069,227 B2
(45) Date of Patent: Aug. 20, 2024

(54) MULTI-MODAL AND MULTI-SPECTRAL STEREO CAMERA ARRAYS

(71) Applicant: INTRINSIC INNOVATION LLC, Mountain View, CA (US)

(72) Inventors: Kartik Venkataraman, San Jose, CA (US); Achuta Kadambi, Los Altos Hills, CA (US); Agastya Kalra, Nepean (CA)

(73) Assignee: Intrinsic Innovation LLC, Mountain View, CA (US)

(*) Notice: Subject to any disclaimer, the term of this patent is extended or adjusted under 35 U.S.C. 154(b) by 168 days.

(21) Appl. No.: 17/198,142

(22) Filed: Mar. 10, 2021

(65) Prior Publication Data

US 2022/0295038 A1    Sep. 15, 2022

(51) Int. Cl.
| | |
|---|---|
| *H04N 13/243* | (2018.01) |
| *G02B 27/28* | (2006.01) |
| *G03B 35/08* | (2021.01) |
| *G06T 5/50* | (2006.01) |
| *H04N 23/56* | (2023.01) |
| *H04N 23/74* | (2023.01) |
| *H04N 23/90* | (2023.01) |

(52) U.S. Cl.
CPC ......... *H04N 13/243* (2018.05); *G02B 27/288* (2013.01); *G03B 35/08* (2013.01); *G06T 5/50* (2013.01); *H04N 23/56* (2023.01); *H04N 23/74* (2023.01); *H04N 23/90* (2023.01); *G06T 2207/20221* (2013.01)

(58) Field of Classification Search
CPC .. H04N 13/243; H04N 5/2256; H04N 5/2354; H04N 5/247; G02B 27/288; G03B 35/08; G06T 5/50; G06T 2207/20221
See application file for complete search history.

(56) References Cited

U.S. PATENT DOCUMENTS

| | | |
|---|---|---|
| 4,124,798 A | 11/1978 | Thompson |
| 4,198,646 A | 4/1980 | Alexander et al. |
| 4,323,925 A | 4/1982 | Abell et al. |

(Continued)

FOREIGN PATENT DOCUMENTS

| | | |
|---|---|---|
| CN | 2488005 Y | 4/2002 |
| CN | 1619358 A | 5/2005 |

(Continued)

OTHER PUBLICATIONS

US 8,957,977 B2, 02/2015, Venkataraman et al. (withdrawn)
(Continued)

*Primary Examiner* — James T Boylan
(74) *Attorney, Agent, or Firm* — Fish & Richardson P.C.

(57) ABSTRACT

A stereo camera array system includes: a first camera array at a first viewpoint including: a first camera configured to capture images in a first modality, the first modality being viewpoint-independent; and a second camera configured to capture images in a second modality different from the first modality; and a second camera array at a second viewpoint spaced apart along a first baseline from the first camera array at the first viewpoint, the second camera array including: a first camera configured to capture images in the first modality; and a second camera configured to capture images in the second modality.

32 Claims, 12 Drawing Sheets

(56) References Cited

U.S. PATENT DOCUMENTS

| | | |
|---|---|---|
| 4,460,449 A | 7/1984 | Montalbano |
| 4,467,365 A | 8/1984 | Murayama et al. |
| 4,652,909 A | 3/1987 | Glenn |
| 4,888,645 A | 12/1989 | Mitchell et al. |
| 4,899,060 A | 2/1990 | Lischke |
| 4,962,425 A | 10/1990 | Rea |
| 5,005,083 A | 4/1991 | Grage et al. |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt et al. |
| 5,327,125 A | 7/1994 | Iwase et al. |
| 5,463,464 A | 10/1995 | Ladewski |
| 5,475,422 A | 12/1995 | Suzuki et al. |
| 5,488,674 A | 1/1996 | Burt et al. |
| 5,517,236 A | 5/1996 | Sergeant et al. |
| 5,629,524 A | 5/1997 | Stettner et al. |
| 5,638,461 A | 6/1997 | Fridge |
| 5,675,377 A | 10/1997 | Gibas et al. |
| 5,703,961 A | 12/1997 | Rogina et al. |
| 5,710,875 A | 1/1998 | Hsu et al. |
| 5,757,425 A | 5/1998 | Barton et al. |
| 5,793,900 A | 8/1998 | Nourbakhsh et al. |
| 5,801,919 A | 9/1998 | Griencewic |
| 5,808,350 A | 9/1998 | Jack et al. |
| 5,832,312 A | 11/1998 | Rieger et al. |
| 5,833,507 A | 11/1998 | Woodgate et al. |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,084,979 A | 7/2000 | Kanade et al. |
| 6,095,989 A | 8/2000 | Hay et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu |
| 6,175,379 B1 | 1/2001 | Uomori et al. |
| 6,185,529 B1 | 2/2001 | Chen et al. |
| 6,198,852 B1 | 3/2001 | Anandan et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,373,518 B1 | 4/2002 | Sogawa |
| 6,419,638 B1 | 7/2002 | Hay et al. |
| 6,443,579 B1 | 9/2002 | Myers |
| 6,445,815 B1 | 9/2002 | Sato |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,546,153 B1 | 4/2003 | Hoydal |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,628,845 B1 | 9/2003 | Stone et al. |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen |
| 6,750,488 B1 | 6/2004 | Driescher et al. |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev et al. |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,833,863 B1 | 12/2004 | Clemens |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 | 10/2005 | Joseph |
| 6,985,175 B2 | 1/2006 | Iwai et al. |
| 7,013,318 B2 | 3/2006 | Rosengard et al. |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Swaminathan et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen et al. |
| 7,430,312 B2 | 9/2008 | Gu |
| 7,471,765 B2 | 12/2008 | Jaffray et al. |
| 7,496,293 B2 | 2/2009 | Shamir et al. |
| 7,564,019 B2 | 7/2009 | Olsen et al. |
| 7,599,547 B2 | 10/2009 | Sun et al. |
| 7,606,484 B1 | 10/2009 | Richards et al. |
| 7,620,265 B1 | 11/2009 | Wolff et al. |
| 7,633,511 B2 | 12/2009 | Shum et al. |
| 7,639,435 B2 | 12/2009 | Chiang |
| 7,639,838 B2 | 12/2009 | Nims |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Nayar et al. |
| 7,956,871 B2 | 6/2011 | Fainstain et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,055,466 B2 | 11/2011 | Bryll |
| 8,077,245 B2 | 12/2011 | Adamo et al. |
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |

(56) References Cited

U.S. PATENT DOCUMENTS

| | | |
|---|---|---|
| 8,111,910 B2 | 2/2012 | Tanaka |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,194,296 B2 | 6/2012 | Compton et al. |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Saint-Pierre et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev et al. |
| 8,406,562 B2 | 3/2013 | Bassi et al. |
| 8,411,146 B2 | 4/2013 | Twede |
| 8,416,282 B2 | 4/2013 | Lablans |
| 8,446,492 B2 | 5/2013 | Nakano et al. |
| 8,456,517 B2 | 6/2013 | Spektor et al. |
| 8,493,496 B2 | 7/2013 | Freedman et al. |
| 8,514,291 B2 | 8/2013 | Chang |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,558,929 B2 | 10/2013 | Tredwell |
| 8,559,705 B2 | 10/2013 | Ng |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,648,919 B2 | 2/2014 | Mantzel et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,787,691 B2 | 7/2014 | Takahashi et al. |
| 8,792,710 B2 | 7/2014 | Keselman |
| 8,804,255 B2 | 8/2014 | Duparre |
| 8,823,813 B2 | 9/2014 | Mantzel et al. |
| 8,830,375 B2 | 9/2014 | Ludwig |
| 8,831,367 B2 | 9/2014 | Venkataraman et al. |
| 8,831,377 B2 | 9/2014 | Pitts et al. |
| 8,836,793 B1 | 9/2014 | Kriesel et al. |
| 8,842,201 B2 | 9/2014 | Tajiri |
| 8,854,433 B1 | 10/2014 | Rafii |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | Duparre et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,247,117 B2 | 1/2016 | Jacques |
| 9,253,380 B2 | 2/2016 | Venkataraman et al. |
| 9,253,397 B2 | 2/2016 | Lee et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,374,512 B2 | 6/2016 | Venkataraman et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |

(56) References Cited

U.S. PATENT DOCUMENTS

| | | | |
|---|---|---|---|
| 9,633,442 B2 | 4/2017 | Venkataraman et al. | |
| 9,635,274 B2 | 4/2017 | Lin et al. | |
| 9,638,883 B1 | 5/2017 | Duparre | |
| 9,661,310 B2 | 5/2017 | Deng et al. | |
| 9,706,132 B2 | 7/2017 | Nisenzon et al. | |
| 9,712,759 B2 | 7/2017 | Venkataraman et al. | |
| 9,729,865 B1 | 8/2017 | Kuo et al. | |
| 9,733,486 B2 | 8/2017 | Lelescu et al. | |
| 9,741,118 B2 | 8/2017 | Mullis | |
| 9,743,051 B2 | 8/2017 | Venkataraman et al. | |
| 9,749,547 B2 | 8/2017 | Venkataraman et al. | |
| 9,749,568 B2 | 8/2017 | McMahon | |
| 9,754,422 B2 | 9/2017 | McMahon et al. | |
| 9,766,380 B2 | 9/2017 | Duparre et al. | |
| 9,769,365 B1 | 9/2017 | Jannard | |
| 9,774,789 B2 | 9/2017 | Ciurea et al. | |
| 9,774,831 B2 | 9/2017 | Venkataraman et al. | |
| 9,787,911 B2 | 10/2017 | McMahon et al. | |
| 9,794,476 B2 | 10/2017 | Nayar et al. | |
| 9,800,856 B2 | 10/2017 | Venkataraman et al. | |
| 9,800,859 B2 | 10/2017 | Venkataraman et al. | |
| 9,807,382 B2 | 10/2017 | Duparre et al. | |
| 9,811,753 B2 | 11/2017 | Venkataraman et al. | |
| 9,813,616 B2 | 11/2017 | Lelescu et al. | |
| 9,813,617 B2 | 11/2017 | Venkataraman et al. | |
| 9,826,212 B2 | 11/2017 | Newton et al. | |
| 9,858,673 B2 | 1/2018 | Ciurea et al. | |
| 9,864,921 B2 | 1/2018 | Venkataraman et al. | |
| 9,866,739 B2 | 1/2018 | McMahon | |
| 9,888,194 B2 | 2/2018 | Duparre | |
| 9,892,522 B2 | 2/2018 | Smirnov et al. | |
| 9,898,856 B2 | 2/2018 | Yang et al. | |
| 9,917,998 B2 | 3/2018 | Venkataraman et al. | |
| 9,924,092 B2 | 3/2018 | Rodda et al. | |
| 9,936,148 B2 | 4/2018 | McMahon | |
| 9,942,474 B2 | 4/2018 | Venkataraman et al. | |
| 9,955,070 B2 | 4/2018 | Lelescu et al. | |
| 9,986,224 B2 | 5/2018 | Mullis | |
| 10,009,538 B2 | 6/2018 | Venkataraman et al. | |
| 10,019,816 B2 | 7/2018 | Venkataraman et al. | |
| 10,027,901 B2 | 7/2018 | Venkataraman et al. | |
| 10,089,740 B2 | 10/2018 | Srikanth et al. | |
| 10,091,405 B2 | 10/2018 | Molina | |
| 10,119,808 B2 | 11/2018 | Venkataraman et al. | |
| 10,122,993 B2 | 11/2018 | Venkataraman et al. | |
| 10,127,682 B2 | 11/2018 | Mullis | |
| 10,142,560 B2 | 11/2018 | Venkataraman et al. | |
| 10,182,216 B2 | 1/2019 | Mullis et al. | |
| 10,218,889 B2 | 2/2019 | McMahan | |
| 10,225,543 B2 | 3/2019 | Mullis | |
| 10,250,871 B2 | 4/2019 | Ciurea et al. | |
| 10,261,219 B2 | 4/2019 | Duparre et al. | |
| 10,275,676 B2 | 4/2019 | Venkataraman et al. | |
| 10,306,120 B2 | 5/2019 | Duparre | |
| 10,311,649 B2 | 6/2019 | McMohan et al. | |
| 10,334,241 B2 | 6/2019 | Duparre et al. | |
| 10,366,472 B2 | 7/2019 | Lelescu et al. | |
| 10,375,302 B2 | 8/2019 | Nayar et al. | |
| 10,375,319 B2 | 8/2019 | Venkataraman et al. | |
| 10,380,752 B2 | 8/2019 | Ciurea et al. | |
| 10,390,005 B2 | 8/2019 | Nisenzon et al. | |
| 10,412,314 B2 | 9/2019 | McMahon et al. | |
| 10,430,682 B2 | 10/2019 | Venkataraman et al. | |
| 10,455,168 B2 | 10/2019 | McMahon | |
| 10,455,218 B2 | 10/2019 | Venkataraman et al. | |
| 10,462,362 B2 | 10/2019 | Lelescu et al. | |
| 10,482,618 B2 | 11/2019 | Jain et al. | |
| 10,540,806 B2 | 1/2020 | Yang et al. | |
| 10,542,208 B2 | 1/2020 | Lelescu et al. | |
| 10,547,772 B2 | 1/2020 | Molina | |
| 10,560,684 B2 | 2/2020 | Mullis | |
| 10,574,905 B2 | 2/2020 | Srikanth et al. | |
| 10,638,099 B2 | 4/2020 | Mullis et al. | |
| 10,643,383 B2 | 5/2020 | Venkataraman | |
| 10,659,751 B1 * | 5/2020 | Briggs | H04N 23/13 |
| 10,674,138 B2 | 6/2020 | Venkataraman et al. | |
| 10,694,114 B2 | 6/2020 | Venkataraman et al. | |
| 10,708,492 B2 | 7/2020 | Venkataraman et al. | |
| 10,735,635 B2 | 8/2020 | Duparre | |
| 10,742,861 B2 | 8/2020 | McMahon | |
| 10,767,981 B2 | 9/2020 | Venkataraman et al. | |
| 10,805,589 B2 | 10/2020 | Venkataraman et al. | |
| 10,818,026 B2 | 10/2020 | Jain et al. | |
| 10,839,485 B2 | 11/2020 | Lelescu et al. | |
| 10,909,707 B2 | 2/2021 | Ciurea et al. | |
| 10,944,961 B2 | 3/2021 | Ciurea et al. | |
| 10,958,892 B2 | 3/2021 | Mullis | |
| 10,984,276 B2 | 4/2021 | Venkataraman et al. | |
| 11,022,725 B2 | 6/2021 | Duparre et al. | |
| 11,024,046 B2 | 6/2021 | Venkataraman | |
| 11,415,791 B1 * | 8/2022 | Park | H04N 23/80 |
| 2001/0005225 A1 | 6/2001 | Clark et al. | |
| 2001/0019621 A1 | 9/2001 | Hanna et al. | |
| 2001/0028038 A1 | 10/2001 | Hamaguchi et al. | |
| 2001/0038387 A1 | 11/2001 | Tomooka et al. | |
| 2002/0003669 A1 | 1/2002 | Kedar et al. | |
| 2002/0012056 A1 | 1/2002 | Trevino et al. | |
| 2002/0015536 A1 | 2/2002 | Warren et al. | |
| 2002/0027608 A1 | 3/2002 | Johnson et al. | |
| 2002/0028014 A1 | 3/2002 | Ono | |
| 2002/0039438 A1 | 4/2002 | Mori et al. | |
| 2002/0057845 A1 | 5/2002 | Fossum et al. | |
| 2002/0061131 A1 | 5/2002 | Sawhney et al. | |
| 2002/0063807 A1 | 5/2002 | Margulis | |
| 2002/0075450 A1 | 6/2002 | Aratani et al. | |
| 2002/0087403 A1 | 7/2002 | Meyers et al. | |
| 2002/0089596 A1 | 7/2002 | Yasuo | |
| 2002/0094027 A1 | 7/2002 | Sato et al. | |
| 2002/0101528 A1 | 8/2002 | Lee et al. | |
| 2002/0113867 A1 | 8/2002 | Takigawa et al. | |
| 2002/0113888 A1 | 8/2002 | Sonoda et al. | |
| 2002/0118113 A1 | 8/2002 | Oku et al. | |
| 2002/0120634 A1 | 8/2002 | Min et al. | |
| 2002/0122113 A1 | 9/2002 | Foote | |
| 2002/0163054 A1 | 11/2002 | Suda | |
| 2002/0167537 A1 | 11/2002 | Trajkovic | |
| 2002/0171666 A1 | 11/2002 | Endo et al. | |
| 2002/0177054 A1 | 11/2002 | Saitoh et al. | |
| 2002/0190991 A1 | 12/2002 | Efran et al. | |
| 2002/0195548 A1 | 12/2002 | Dowski, Jr. et al. | |
| 2003/0025227 A1 | 2/2003 | Daniell | |
| 2003/0026474 A1 | 2/2003 | Yano | |
| 2003/0086079 A1 | 5/2003 | Barth et al. | |
| 2003/0124763 A1 | 7/2003 | Fan et al. | |
| 2003/0140347 A1 | 7/2003 | Varsa | |
| 2003/0156189 A1 | 8/2003 | Utsumi et al. | |
| 2003/0179418 A1 | 9/2003 | Wengender et al. | |
| 2003/0188659 A1 | 10/2003 | Merry et al. | |
| 2003/0190072 A1 | 10/2003 | Adkins et al. | |
| 2003/0198377 A1 | 10/2003 | Ng | |
| 2003/0211405 A1 | 11/2003 | Venkataraman | |
| 2003/0231179 A1 | 12/2003 | Suzuki | |
| 2004/0003409 A1 | 1/2004 | Berstis | |
| 2004/0008271 A1 | 1/2004 | Hagimori et al. | |
| 2004/0012689 A1 | 1/2004 | Tinnerino et al. | |
| 2004/0027358 A1 | 2/2004 | Nakao | |
| 2004/0047274 A1 | 3/2004 | Amanai | |
| 2004/0050104 A1 | 3/2004 | Ghosh et al. | |
| 2004/0056966 A1 | 3/2004 | Schechner et al. | |
| 2004/0061787 A1 | 4/2004 | Liu et al. | |
| 2004/0066454 A1 | 4/2004 | Otani et al. | |
| 2004/0071367 A1 | 4/2004 | Irani et al. | |
| 2004/0075654 A1 | 4/2004 | Hsiao et al. | |
| 2004/0096119 A1 | 5/2004 | Williams et al. | |
| 2004/0100570 A1 | 5/2004 | Shizukuishi | |
| 2004/0105021 A1 | 6/2004 | Hu | |
| 2004/0114807 A1 | 6/2004 | Lelescu et al. | |
| 2004/0141659 A1 | 7/2004 | Zhang | |
| 2004/0151401 A1 | 8/2004 | Sawhney et al. | |
| 2004/0165090 A1 | 8/2004 | Ning | |
| 2004/0169617 A1 | 9/2004 | Yelton et al. | |
| 2004/0170340 A1 | 9/2004 | Tipping et al. | |
| 2004/0174439 A1 | 9/2004 | Upton | |
| 2004/0179008 A1 | 9/2004 | Gordon et al. | |

(56) References Cited

U.S. PATENT DOCUMENTS

| | | |
|---|---|---|
| 2004/0179834 A1 | 9/2004 | Szajewski et al. |
| 2004/0196379 A1 | 10/2004 | Chen et al. |
| 2004/0207600 A1 | 10/2004 | Zhang et al. |
| 2004/0207836 A1 | 10/2004 | Chhibber et al. |
| 2004/0212734 A1 | 10/2004 | Macinnis et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0111705 A1 | 5/2005 | Waupotitsch et al. |
| 2005/0117015 A1 | 6/2005 | Cutler |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0203380 A1 | 9/2005 | Sauer et al. |
| 2005/0205785 A1 | 9/2005 | Hornback et al. |
| 2005/0219264 A1 | 10/2005 | Shum et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0013318 A1 | 1/2006 | Webb et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother et al. |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0119597 A1 | 6/2006 | Oshino |
| 2006/0125936 A1 | 6/2006 | Gruhike et al. |
| 2006/0138322 A1 | 6/2006 | Costello et al. |
| 2006/0139475 A1 | 6/2006 | Esch et al. |
| 2006/0152803 A1 | 7/2006 | Provitola |
| 2006/0153290 A1 | 7/2006 | Watabe et al. |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187322 A1 | 8/2006 | Janson, Jr. et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen et al. |
| 2006/0215924 A1 | 9/2006 | Steinberg et al. |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam et al. |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0116447 A1 | 5/2007 | Ye |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0140685 A1 | 6/2007 | Wu |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0166447 A1 | 7/2007 | Ur-Rehman et al. |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer et al. |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0291995 A1 | 12/2007 | Rivera |
| 2007/0296721 A1 | 12/2007 | Chang et al. |
| 2007/0296832 A1 | 12/2007 | Ota et al. |
| 2007/0296835 A1 | 12/2007 | Olsen et al. |
| 2007/0296846 A1 | 12/2007 | Barman et al. |
| 2007/0296847 A1 | 12/2007 | Chang et al. |
| 2007/0297696 A1 | 12/2007 | Hamza et al. |
| 2008/0006859 A1 | 1/2008 | Mionetto |
| 2008/0019611 A1 | 1/2008 | Larkin et al. |

(56) References Cited

U.S. PATENT DOCUMENTS

| | | |
|---|---|---|
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0044170 A1 | 2/2008 | Yap et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152213 A1 | 6/2008 | Medioni et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0208506 A1 | 8/2008 | Kuwata |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0246866 A1 | 10/2008 | Kinoshita et al. |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0066693 A1 | 3/2009 | Carson |
| 2009/0079862 A1 | 3/2009 | Subbotin |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0092363 A1 | 4/2009 | Daum et al. |
| 2009/0096050 A1 | 4/2009 | Park |
| 2009/0102956 A1 | 4/2009 | Georgiev |
| 2009/0103792 A1 | 4/2009 | Rahn et al. |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167923 A1 | 7/2009 | Safaee-Rad et al. |
| 2009/0167934 A1 | 7/2009 | Gupta |
| 2009/0175349 A1 | 7/2009 | Ye et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0245637 A1 | 10/2009 | Barman et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0273663 A1 | 11/2009 | Yoshida |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang |
| 2010/0045809 A1 | 2/2010 | Packard |
| 2010/0053342 A1 | 3/2010 | Hwang et al. |
| 2010/0053347 A1 | 3/2010 | Agarwala et al. |
| 2010/0053415 A1 | 3/2010 | Yun |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085351 A1 | 4/2010 | Deb et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097444 A1 | 4/2010 | Lablans |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0129048 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194860 A1 | 8/2010 | Mentz et al. |
| 2010/0194901 A1 | 8/2010 | van Hoorebeke et al. |
| 2010/0195716 A1 | 8/2010 | Klein Gunnewiek et al. |
| 2010/0201809 A1 | 8/2010 | Oyama et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |

(56) References Cited

U.S. PATENT DOCUMENTS

| | | |
|---|---|---|
| 2010/0214423 A1 | 8/2010 | Ogawa |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Panahpour Tehrani et al. |
| 2010/0259610 A1 | 10/2010 | Petersen |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0277629 A1 | 11/2010 | Tanaka |
| 2010/0281070 A1 | 11/2010 | Chan et al. |
| 2010/0283837 A1 | 11/2010 | Oohchida et al. |
| 2010/0289941 A1 | 11/2010 | Ito et al. |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu |
| 2010/0321640 A1 | 12/2010 | Yeh et al. |
| 2010/0329556 A1 | 12/2010 | Mitarai et al. |
| 2010/0329582 A1 | 12/2010 | Albu et al. |
| 2011/0001037 A1 | 1/2011 | Tewinkle |
| 2011/0013006 A1 | 1/2011 | Uzenbajakava et al. |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032341 A1 | 2/2011 | Ignatov et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043604 A1 | 2/2011 | Peleg et al. |
| 2011/0043613 A1 | 2/2011 | Rohaly et al. |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1* | 3/2011 | Venkataraman .......... G06T 7/55 348/E5.024 |
| 2011/0074992 A1 | 3/2011 | Ajito et al. |
| 2011/0080487 A1 | 4/2011 | Venkataraman et al. |
| 2011/0084893 A1 | 4/2011 | Lee et al. |
| 2011/0085028 A1 | 4/2011 | Samadani et al. |
| 2011/0090217 A1 | 4/2011 | Mashitani et al. |
| 2011/0102553 A1 | 5/2011 | Corcoran et al. |
| 2011/0108708 A1 | 5/2011 | Olsen et al. |
| 2011/0115886 A1 | 5/2011 | Nguyen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0150321 A1 | 6/2011 | Cheong et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0199458 A1 | 8/2011 | Hayasaka et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0211068 A1 | 9/2011 | Yokota |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra et al. |
| 2011/0222757 A1 | 9/2011 | Yeatman, Jr. et al. |
| 2011/0228142 A1 | 9/2011 | Brueckner et al. |
| 2011/0228144 A1 | 9/2011 | Tian et al. |
| 2011/0234825 A1 | 9/2011 | Liu et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung et al. |
| 2011/0255745 A1 | 10/2011 | Hodder et al. |
| 2011/0255786 A1 | 10/2011 | Hunter et al. |
| 2011/0261993 A1 | 10/2011 | Weiming et al. |
| 2011/0267264 A1 | 11/2011 | Mccarthy et al. |
| 2011/0267348 A1 | 11/2011 | Lin et al. |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain |
| 2012/0013748 A1 | 1/2012 | Stanwood et al. |
| 2012/0014456 A1 | 1/2012 | Martinez Bauza et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0026478 A1 | 2/2012 | Chen et al. |
| 2012/0038745 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian et al. |
| 2012/0069235 A1 | 3/2012 | Imai |
| 2012/0081519 A1 | 4/2012 | Goma et al. |
| 2012/0086803 A1 | 4/2012 | Malzbender et al. |
| 2012/0105590 A1 | 5/2012 | Fukumoto et al. |
| 2012/0105654 A1 | 5/2012 | Kwatra et al. |
| 2012/0105691 A1 | 5/2012 | Waqas et al. |
| 2012/0113232 A1 | 5/2012 | Joblove |
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0114260 A1 | 5/2012 | Takahashi et al. |
| 2012/0120264 A1 | 5/2012 | Lee et al. |
| 2012/0127275 A1 | 5/2012 | Von Zitzewitz et al. |
| 2012/0127284 A1 | 5/2012 | Bar-Zeev et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0162374 A1 | 6/2012 | Markas et al. |

(56) References Cited

U.S. PATENT DOCUMENTS

| | | |
|---|---|---|
| 2012/0163672 A1 | 6/2012 | McKinnon |
| 2012/0163725 A1 | 6/2012 | Fukuhara |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0182397 A1* | 7/2012 | Heinzle ............... G06T 7/80 348/47 |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai et al. |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0218455 A1 | 8/2012 | Imai et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0250990 A1 | 10/2012 | Bocirnea |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh |
| 2012/0287291 A1 | 11/2012 | McMahon |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307084 A1 | 12/2012 | Mantzel |
| 2012/0307093 A1 | 12/2012 | Miyoshi |
| 2012/0307099 A1 | 12/2012 | Yahata |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0002953 A1 | 1/2013 | Noguchi et al. |
| 2013/0003184 A1 | 1/2013 | Duparre |
| 2013/0010073 A1 | 1/2013 | Do et al. |
| 2013/0016245 A1 | 1/2013 | Yuba |
| 2013/0016885 A1 | 1/2013 | Tsujimoto |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0100254 A1 | 4/2013 | Morioka et al. |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu et al. |
| 2013/0127988 A1 | 5/2013 | Wang et al. |
| 2013/0128049 A1 | 5/2013 | Schofield et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares et al. |
| 2013/0135448 A1 | 5/2013 | Nagumo et al. |
| 2013/0147979 A1 | 6/2013 | McMahon et al. |
| 2013/0155050 A1 | 6/2013 | Rastogi et al. |
| 2013/0162641 A1 | 6/2013 | Zhang et al. |
| 2013/0169754 A1 | 7/2013 | Aronsson et al. |
| 2013/0176394 A1 | 7/2013 | Tian et al. |
| 2013/0208138 A1 | 8/2013 | Li et al. |
| 2013/0215108 A1 | 8/2013 | McMahon et al. |
| 2013/0215231 A1 | 8/2013 | Hiramoto et al. |
| 2013/0216144 A1 | 8/2013 | Robinson et al. |
| 2013/0222556 A1 | 8/2013 | Shimada |
| 2013/0222656 A1 | 8/2013 | Kaneko |
| 2013/0223759 A1 | 8/2013 | Nishiyama |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone et al. |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By |
| 2013/0278631 A1 | 10/2013 | Border et al. |
| 2013/0286236 A1 | 10/2013 | Mankowski |
| 2013/0293760 A1 | 11/2013 | Nisenzon et al. |
| 2013/0308197 A1 | 11/2013 | Duparre |
| 2013/0321581 A1 | 12/2013 | El-Ghoroury et al. |
| 2013/0321589 A1 | 12/2013 | Kirk et al. |
| 2013/0335598 A1 | 12/2013 | Gustavsson et al. |
| 2013/0342641 A1 | 12/2013 | Morioka et al. |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0059462 A1 | 2/2014 | Wernersson |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0081454 A1 | 3/2014 | Nuyujukian et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0125760 A1 | 5/2014 | Au et al. |
| 2014/0125771 A1 | 5/2014 | Grossmann et al. |
| 2014/0132810 A1 | 5/2014 | McMahon |
| 2014/0139642 A1 | 5/2014 | Ni et al. |
| 2014/0139643 A1 | 5/2014 | Hogasten et al. |
| 2014/0140626 A1 | 5/2014 | Cho et al. |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183258 A1 | 7/2014 | DiMuro |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |

(56) References Cited

U.S. PATENT DOCUMENTS

| | | |
|---|---|---|
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0307058 A1 | 10/2014 | Kirk et al. |
| 2014/0307063 A1 | 10/2014 | Lee |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042814 A1 | 2/2015 | Vaziri |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0095235 A1 | 4/2015 | Dua |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0138346 A1* | 5/2015 | Venkataraman ....... G01B 11/22 348/135 |
| 2015/0146029 A1 | 5/2015 | Venkataraman et al. |
| 2015/0146030 A1 | 5/2015 | Venkataraman et al. |
| 2015/0161798 A1 | 6/2015 | Venkataraman et al. |
| 2015/0199793 A1 | 7/2015 | Venkataraman et al. |
| 2015/0199841 A1 | 7/2015 | Venkataraman et al. |
| 2015/0207990 A1 | 7/2015 | Ford et al. |
| 2015/0228081 A1 | 8/2015 | Kim et al. |
| 2015/0235476 A1 | 8/2015 | McMahon et al. |
| 2015/0237329 A1 | 8/2015 | Venkataraman et al. |
| 2015/0243480 A1 | 8/2015 | Yamada |
| 2015/0244927 A1 | 8/2015 | Laroia et al. |
| 2015/0245013 A1 | 8/2015 | Venkataraman et al. |
| 2015/0248744 A1 | 9/2015 | Hayasaka et al. |
| 2015/0254868 A1 | 9/2015 | Srikanth et al. |
| 2015/0264337 A1 | 9/2015 | Venkataraman et al. |
| 2015/0288861 A1 | 10/2015 | Duparre |
| 2015/0296137 A1 | 10/2015 | Duparre et al. |
| 2015/0312455 A1 | 10/2015 | Venkataraman et al. |
| 2015/0317638 A1 | 11/2015 | Donaldson |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2016/0037097 A1 | 2/2016 | Duparre |
| 2016/0042548 A1 | 2/2016 | Du et al. |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0182786 A1 | 6/2016 | Anderson et al. |
| 2016/0191768 A1 | 6/2016 | Shin et al. |
| 2016/0195733 A1 | 7/2016 | Lelescu et al. |
| 2016/0198096 A1 | 7/2016 | McMahon et al. |
| 2016/0198144 A1 | 7/2016 | Yu et al. |
| 2016/0209654 A1 | 7/2016 | Riccomini et al. |
| 2016/0210785 A1 | 7/2016 | Balachandreswaran et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267486 A1 | 9/2016 | Mitra et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0309084 A1 | 10/2016 | Venkataraman et al. |
| 2016/0309134 A1* | 10/2016 | Venkataraman ....... H04N 23/90 |
| 2016/0316140 A1 | 10/2016 | Nayar et al. |
| 2016/0323578 A1 | 11/2016 | Kaneko et al. |
| 2017/0004791 A1 | 1/2017 | Aubineau et al. |
| 2017/0006233 A1 | 1/2017 | Venkataraman et al. |
| 2017/0011405 A1 | 1/2017 | Pandey |
| 2017/0013209 A1 | 1/2017 | Macmillan et al. |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0070753 A1 | 3/2017 | Kaneko |
| 2017/0078568 A1 | 3/2017 | Venkataraman et al. |
| 2017/0085845 A1 | 3/2017 | Venkataraman et al. |
| 2017/0094233 A1 | 3/2017 | Lin et al. |
| 2017/0094243 A1 | 3/2017 | Venkataraman et al. |
| 2017/0099465 A1 | 4/2017 | Mullis et al. |
| 2017/0109742 A1 | 4/2017 | Varadarajan |
| 2017/0142405 A1 | 5/2017 | Shors et al. |
| 2017/0163862 A1 | 6/2017 | Molina |
| 2017/0178363 A1 | 6/2017 | Venkataraman et al. |
| 2017/0187933 A1 | 6/2017 | Duparre |
| 2017/0188011 A1 | 6/2017 | Panescu et al. |
| 2017/0244960 A1 | 8/2017 | Ciurea et al. |
| 2017/0257562 A1 | 9/2017 | Venkataraman et al. |
| 2017/0365104 A1 | 12/2017 | McMahon et al. |
| 2018/0005244 A1 | 1/2018 | Govindarajan et al. |
| 2018/0007284 A1 | 1/2018 | Venkataraman et al. |
| 2018/0013945 A1 | 1/2018 | Ciurea et al. |
| 2018/0024330 A1 | 1/2018 | Laroia |
| 2018/0035057 A1 | 2/2018 | McMahon et al. |
| 2018/0040135 A1 | 2/2018 | Mullis |
| 2018/0048830 A1 | 2/2018 | Venkataraman et al. |
| 2018/0048879 A1 | 2/2018 | Venkataraman et al. |
| 2018/0081090 A1 | 3/2018 | Duparre et al. |
| 2018/0097993 A1 | 4/2018 | Nayar et al. |

(56) References Cited

U.S. PATENT DOCUMENTS

| | | | |
|---|---|---|---|
| 2018/0109782 A1 | 4/2018 | Duparre et al. | |
| 2018/0124311 A1 | 5/2018 | Lelescu et al. | |
| 2018/0131852 A1 | 5/2018 | McMahon | |
| 2018/0139382 A1 | 5/2018 | Venkataraman et al. | |
| 2018/0189767 A1 | 7/2018 | Bigioi | |
| 2018/0197035 A1 | 7/2018 | Venkataraman et al. | |
| 2018/0211402 A1 | 7/2018 | Ciurea et al. | |
| 2018/0224270 A1* | 8/2018 | Wolke | G01S 7/4865 |
| 2018/0227511 A1 | 8/2018 | McMahon | |
| 2018/0240265 A1 | 8/2018 | Yang et al. | |
| 2018/0270473 A1 | 9/2018 | Mullis | |
| 2018/0286120 A1 | 10/2018 | Fleishman et al. | |
| 2018/0302554 A1 | 10/2018 | Lelescu et al. | |
| 2018/0330182 A1 | 11/2018 | Venkataraman et al. | |
| 2018/0376122 A1 | 12/2018 | Park et al. | |
| 2019/0012768 A1 | 1/2019 | Tafazoli Bilandi et al. | |
| 2019/0037116 A1 | 1/2019 | Molina | |
| 2019/0037150 A1 | 1/2019 | Srikanth et al. | |
| 2019/0043253 A1 | 2/2019 | Lucas et al. | |
| 2019/0057513 A1 | 2/2019 | Jain et al. | |
| 2019/0063905 A1 | 2/2019 | Venkataraman et al. | |
| 2019/0089947 A1 | 3/2019 | Venkataraman et al. | |
| 2019/0098209 A1 | 3/2019 | Venkataraman et al. | |
| 2019/0109998 A1 | 4/2019 | Venkataraman et al. | |
| 2019/0164341 A1 | 5/2019 | Venkataraman | |
| 2019/0174040 A1 | 6/2019 | Mcmahon | |
| 2019/0197735 A1 | 6/2019 | Xiong et al. | |
| 2019/0215496 A1 | 7/2019 | Mullis et al. | |
| 2019/0230348 A1 | 7/2019 | Ciurea et al. | |
| 2019/0235138 A1 | 8/2019 | Duparre et al. | |
| 2019/0243086 A1 | 8/2019 | Rodda et al. | |
| 2019/0244379 A1 | 8/2019 | Venkataraman | |
| 2019/0268586 A1 | 8/2019 | Mullis | |
| 2019/0289176 A1 | 9/2019 | Duparre | |
| 2019/0347768 A1 | 11/2019 | Lelescu et al. | |
| 2019/0356863 A1 | 11/2019 | Venkataraman et al. | |
| 2019/0362515 A1 | 11/2019 | Ciurea et al. | |
| 2019/0364263 A1 | 11/2019 | Jannard et al. | |
| 2020/0026948 A1 | 1/2020 | Venkataraman et al. | |
| 2020/0151894 A1 | 5/2020 | Jain et al. | |
| 2020/0252597 A1 | 8/2020 | Mullis | |
| 2020/0334905 A1 | 10/2020 | Venkataraman | |
| 2020/0389604 A1 | 12/2020 | Venkataraman et al. | |
| 2021/0042952 A1 | 2/2021 | Jain et al. | |
| 2021/0044790 A1 | 2/2021 | Venkataraman et al. | |
| 2021/0063141 A1 | 3/2021 | Venkataraman et al. | |
| 2021/0084284 A1* | 3/2021 | McEldowney | H04N 23/55 |
| 2021/0133927 A1 | 5/2021 | Lelescu et al. | |
| 2021/0150748 A1 | 5/2021 | Ciurea et al. | |
| 2021/0233326 A1* | 7/2021 | Li | G06T 17/00 |

FOREIGN PATENT DOCUMENTS

| | | | |
|---|---|---|---|
| CN | 1669332 A | 9/2005 |
| CN | 1727991 A | 2/2006 |
| CN | 1839394 A | 9/2006 |
| CN | 1985524 A | 6/2007 |
| CN | 1992499 A | 7/2007 |
| CN | 101010619 A | 8/2007 |
| CN | 101046882 A | 10/2007 |
| CN | 101064780 A | 10/2007 |
| CN | 101102388 A | 1/2008 |
| CN | 101147392 A | 3/2008 |
| CN | 201043890 Y | 4/2008 |
| CN | 101212566 A | 7/2008 |
| CN | 101312540 A | 11/2008 |
| CN | 101427372 A | 5/2009 |
| CN | 101551586 A | 10/2009 |
| CN | 101593350 A | 12/2009 |
| CN | 101606086 A | 12/2009 |
| CN | 101785025 A | 7/2010 |
| CN | 101883291 A | 11/2010 |
| CN | 102037717 A | 4/2011 |
| CN | 102164298 A | 8/2011 |
| CN | 102184720 A | 9/2011 |
| CN | 102375199 A | 3/2012 |
| CN | 103004180 A | 3/2013 |
| CN | 103765864 A | 4/2014 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 105409212 A | 3/2016 |
| CN | 103765864 B | 7/2017 |
| CN | 104081414 B | 8/2017 |
| CN | 104662589 B | 8/2017 |
| CN | 107077743 A | 8/2017 |
| CN | 107230236 A | 10/2017 |
| CN | 107346061 A | 11/2017 |
| CN | 107404609 A | 11/2017 |
| CN | 104685513 B | 4/2018 |
| CN | 107924572 A | 4/2018 |
| CN | 108307675 A | 7/2018 |
| CN | 104335246 B | 9/2018 |
| CN | 107404609 B | 2/2020 |
| CN | 107346061 B | 4/2020 |
| CN | 107230236 B | 12/2020 |
| CN | 108307675 B | 12/2020 |
| CN | 107077743 B | 3/2021 |
| DE | 602011041799.1 | 9/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1734766 A2 | 12/2006 |
| EP | 1991145 A1 | 11/2008 |
| EP | 1243945 B1 | 1/2009 |
| EP | 2026563 A1 | 2/2009 |
| EP | 2031592 A1 | 3/2009 |
| EP | 2041454 A2 | 4/2009 |
| EP | 2072785 A1 | 6/2009 |
| EP | 2104334 A1 | 9/2009 |
| EP | 2136345 A1 | 12/2009 |
| EP | 2156244 A1 | 2/2010 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2386554 A1 | 11/2011 |
| EP | 2462477 A1 | 6/2012 |
| EP | 2502115 A2 | 9/2012 |
| EP | 2569935 A1 | 3/2013 |
| EP | 2652678 A1 | 10/2013 |
| EP | 2677066 A1 | 12/2013 |
| EP | 2708019 A1 | 3/2014 |
| EP | 2761534 A1 | 8/2014 |
| EP | 2777245 A1 | 9/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 2973476 A1 | 1/2016 |
| EP | 3066690 A1 | 9/2016 |
| EP | 2569935 B1 | 12/2016 |
| EP | 3201877 A1 | 8/2017 |
| EP | 2652678 B1 | 9/2017 |
| EP | 3284061 A1 | 2/2018 |
| EP | 3286914 A1 | 2/2018 |
| EP | 3201877 A4 | 3/2018 |
| EP | 2817955 B1 | 4/2018 |
| EP | 3328048 A1 | 5/2018 |
| EP | 3075140 B1 | 6/2018 |
| EP | 3201877 B1 | 12/2018 |
| EP | 3467776 A1 | 4/2019 |
| EP | 2708019 B1 | 10/2019 |
| EP | 3286914 B1 | 12/2019 |
| EP | 2761534 B1 | 11/2020 |
| EP | 2888720 B1 | 3/2021 |
| EP | 3328048 B1 | 4/2021 |
| GB | 2482022 A | 1/2012 |
| IN | 2708/CHENP/2014 | 8/2015 |

(56) References Cited

FOREIGN PATENT DOCUMENTS

| | | |
|---|---|---|
| IN | 361194 | 3/2021 |
| JP | 59-025483 | 2/1984 |
| JP | 64-037177 | 2/1989 |
| JP | 02-285772 A | 11/1990 |
| JP | 06129851 A | 5/1994 |
| JP | 07-015457 A | 1/1995 |
| JP | H0756112 A | 3/1995 |
| JP | 09171075 A | 6/1997 |
| JP | 09181913 A | 7/1997 |
| JP | 10253351 A | 9/1998 |
| JP | 11142609 A | 5/1999 |
| JP | 11223708 A | 8/1999 |
| JP | 11325889 A | 11/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002209226 A | 7/2002 |
| JP | 2002250607 A | 9/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005341569 A | 12/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008172735 A | 7/2008 |
| JP | 2008258885 A | 10/2008 |
| JP | 2009064421 A | 3/2009 |
| JP | 2009132010 A | 6/2009 |
| JP | 2009300268 A | 12/2009 |
| JP | 2010139288 A | 6/2010 |
| JP | 2011017764 A | 1/2011 |
| JP | 2011030184 A | 2/2011 |
| JP | 2011109484 A | 6/2011 |
| JP | 2011523538 A | 8/2011 |
| JP | 2011203238 A | 10/2011 |
| JP | 2012504805 A | 2/2012 |
| JP | 2011052064 A1 | 3/2013 |
| JP | 2013509022 A | 3/2013 |
| JP | 2013526801 A | 6/2013 |
| JP | 2014519741 A | 8/2014 |
| JP | 2014521117 A | 8/2014 |
| JP | 2014535191 A | 12/2014 |
| JP | 2015022510 A | 2/2015 |
| JP | 2015522178 A | 8/2015 |
| JP | 2015534734 A | 12/2015 |
| JP | 5848754 B2 | 1/2016 |
| JP | 2016524125 A | 8/2016 |
| JP | 6140709 | 5/2017 |
| JP | 2017163550 A | 9/2017 |
| JP | 2017163587 A | 9/2017 |
| JP | 2017531976 A | 10/2017 |
| JP | 6546613 B2 | 7/2019 |
| JP | 2019-220957 A | 12/2019 |
| JP | 6630891 B2 | 12/2019 |
| JP | 2020017999 A | 1/2020 |
| JP | 6767543 B2 | 9/2020 |
| JP | 6767558 B2 | 9/2020 |
| KR | 10200500042 39 A | 1/2005 |
| KR | 100496875 B1 | 6/2005 |
| KR | 1020110097647 A | 8/2011 |
| KR | 20140045373 A | 4/2014 |
| KR | 20170063827 A | 6/2017 |
| KR | 101824672 B1 | 2/2018 |
| KR | 101843994 B1 | 3/2018 |
| KR | 101973822 B1 | 4/2019 |
| KR | 10-2002165 B1 | 7/2019 |
| KR | 10-2111181 B1 | 5/2020 |
| SG | 191151 A1 | 7/2013 |
| SG | 11201500910 R | 10/2015 |
| TW | 200828994 A | 7/2008 |
| TW | 200939739 A | 9/2009 |
| TW | 201228382 A | 7/2012 |
| TW | I535292 B | 5/2016 |
| WO | 1994020875 A3 | 9/1994 |
| WO | 2005057922 A1 | 6/2005 |
| WO | 2006039906 A2 | 4/2006 |
| WO | 2006039906 A3 | 4/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2010037512 A1 | 4/2010 |
| WO | 2011008443 A2 | 1/2011 |
| WO | 2011026527 A1 | 3/2011 |
| WO | 2011046607 A2 | 4/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011121117 A1 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |
| WO | 2014031795 A1 | 2/2014 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014131038 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |

(56) References Cited

FOREIGN PATENT DOCUMENTS

| | | | |
|---|---|---|---|
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015048906 A1 | 4/2015 |
| WO | 2015070105 A1 | 5/2015 |
| WO | 2015074078 A1 | 5/2015 |
| WO | 2015081279 A1 | 6/2015 |
| WO | 2015134996 A1 | 9/2015 |
| WO | 2015183824 A1 | 12/2015 |
| WO | 2016054089 A1 | 4/2016 |
| WO | 2016/172125 | 10/2016 |
| WO | 2016167814 A1 | 10/2016 |
| WO | 2016172125 A9 | 4/2017 |
| WO | 2018053181 A1 | 3/2018 |
| WO | 2019038193 A1 | 2/2019 |

OTHER PUBLICATIONS

Kadambi, A. et al., "Polarized 3d: High-Quality Depth Sensing with Polarization Cues", In *Proceedings of the IEEE International Conference on Computer Vision* (pp. 3370-3378), 2015.

Garrido-Jurado, S. et al., "Automatic generation and detection of highly reliable fiducial markers under occlusion." *Pattern Recognition*, 47.6 (2014): 2280-2292.

An, Gwon Hwan, et al., "Charuco board-based omnidirectional camera calibration method." *Electronics* 7.12 (2018): 421, 15 pages.

Ansari et al., "3-D Face Modeling Using Two Views and a Generic Face Model with Application to 3-D Face Recognition", Proceedings of the IEEE Conference on Advanced Video and Signal Based Surveillance, Jul. 22, 2003, 9 pgs.

Aufderheide et al., "A MEMS-based Smart Sensor System for Estimation of Camera Pose for Computer Vision Applications", Research and Innovation Conference 2011, Jul. 29, 2011, pp. 1-10.

Baker et al., "Limits on Super-Resolution and How to Break Them", IEEE Transactions on Pattern Analysis and Machine Intelligence, Sep. 2002, vol. 24, No. 9, pp. 1167-1183.

Banz et al., "Real-Time Semi-Global Matching Disparity Estimation on the GPU", IEEE Transactions on Pattern Analysis and Machine Intelligence, Sep. 2002, vol. 24, No. 9, pp. 1167-1183.

Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.

Bennett et al., "Multispectral Bilateral Video Fusion", Computer Graphics (ACM SIGGRAPH Proceedings), Jul. 25, 2006, published Jul. 30, 2006, 1 pg.

Bennett et al., "Multispectral Video Fusion", Computer Graphics (ACM SIGGRAPH Proceedings), Jul. 25, 2006, published Jul. 30, 2006, 1 pg.

Berretti et al., "Face Recognition by Super-Resolved 3D Models from Consumer Depth Cameras", IEEE Transactions on Information Forensics and Security, vol. 9, No. 9, Sep. 2014, pp. 1436-1448.

Bertalmio et al., "Image Inpainting", Proceedings of the 27th Annual Conference on Computer Graphics and Interactive Techniques, 2000, ACM Pres/Addison-Wesley Publishing Co., pp. 417-424.

Bertero et al., "Super-resolution in computational imaging", Micron, Jan. 1, 2003, vol. 34, Issues 6-7, 17 pgs.

Bishop et al., "Full-Resolution Depth Map Estimation from an Aliased Plenoptic Light Field", ACCV Nov. 8, 2010, Part II, LNCS 6493, pp. 186-200.

Bishop et al., "Light Field Superresolution", Computational Photography (ICCP), 2009 IEEE International Conference, Conference Date Apr. 16-17, published Jan. 26, 2009, 9 pgs.

Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.

Blanz et al., "A Morphable Model for The Synthesis of 3D Faces", In Proceedings of ACM SIGGRAPH 1999, Jul. 1, 1999, pp. 187-194.

Borman, "Topics in Multiframe Superresolution Restoration", Thesis of Sean Borman, Apr. 2004, 282 pgs.

Borman et al., "Image Sequence Processing", Dekker Encyclopedia of Optical Engineering, Oct. 14, 2002, 81 pgs.

Borman et al., "Linear models for multi-frame super-resolution restoration under non-affine registration and spatially varying PSF", Proc. SPIE, May 21, 2004, vol. 5299, 12 pgs.

Borman et al., "Simultaneous Multi-Frame MAP Super-Resolution Video Enhancement Using Spatio-Temporal Priors", Image Processing, 1999, ICIP 99 Proceedings, vol. 3, pp. 469-473.

Borman et al., "Super-Resolution from Image Sequences—A Review", Circuits & Systems, 1998, pp. 374-378.

Borman et al., "Nonlinear Prediction Methods for Estimation of Clique Weighting Parameters in NonGaussian Image Models", Proc. SPIE, Sep. 22, 1998, vol. 3459, 9 pgs.

Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.

Borman et al., "Image Resampling and Constraint Formulation for Multi-Frame Super-Resolution Restoration", Proc SPIE, Dec. 28, 1998, vol. 3653, 10 pgs.

Bose et al., "Superresolution and Noise Filtering Using Moving Least Squares", IEEE Transactions on Image Processing, Aug. 2006, vol. 15, Issue 8, published Jul. 17, 2006, pp. 2239-2248.

Boye et al., "Comparison of Subpixel Image Registration Algorithms", Proc. of SPIE—IS&T Electronic Imaging, Feb. 3, 2009, vol. 7246, pp. 72460X-1-72460X-9; doi: 10.1117/12.810369.

Bruckner et al., "Thin wafer-level camera lenses inspired by insect compound eyes", Optics Express, Nov. 22, 2010, vol. 18, No. 24, pp. 24379-24394.

Bruckner et al., "Artificial compound eye applying hyperacuity", Optics Express, Dec. 11, 2006, vol. 14, No. 25, pp. 12076-12084.

Bruckner et al., "Driving microoptical imaging systems towards miniature camera applications", Proc. SPIE, Micro-Optics, May 13, 2010, 11 pgs.

Bryan et al., "Perspective Distortion from Interpersonal Distance Is an Implicit Visual Cue for Social Judgments of Faces", PLOS One, vol. 7, Issue 9, Sep. 26, 2012, e45301, doi:10.1371/journal.pone.0045301, 9 pgs.

Bulat et al., "How far are we from solving the 2D & 3D Face Alignment problem? (and a dataset of 230,000 3D facial landmarks)", arxiv.org, Cornell University Library, 201 Olin Library Cornell University Ithaca, NY 14853, Mar. 21, 2017.

Cai et al., "3D Deformable Face Tracking with a Commodity Depth Camera", Proceedings of the European Conference on Computer Vision: Part III, Sep. 5-11, 2010, 14pgs.

Capel, "Image Mosaicing and Super-resolution", Retrieved on Nov. 10, 2012, Retrieved from the Internet at URL:<http://citeseerx.ist.psu.edu/viewdoc/download?doi=10.1.1.226.2643&rep=rep1&type=pdf>, 2001, 269 pgs.

Caron et al., "Multiple camera types simultaneous stereo calibration, Robotics and Automation (ICRA)", 2011 IEEE International Conference On, May 1, 2011 (May 1, 2011), pp. 2933-2938.

Carroll et al., "Image Warps for Artistic Perspective Manipulation", ACM Transactions on Graphics (TOG), vol. 29, No. 4, Jul. 26, 2010, Article No. 127, 9 pgs.

Chan et al., "Investigation of Computational Compound-Eye Imaging System with Super-Resolution Reconstruction", IEEE, ISASSP, Jun. 19, 2006, pp. 1177-1180.

Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.

Chan et al., "Super-resolution reconstruction in a computational compound-eye imaging system", Multidim. Syst. Sign. Process, published online Feb. 23, 2007, vol. 18, pp. 83-101.

(56) References Cited

OTHER PUBLICATIONS

Chen et al., "Interactive deformation of light fields", Symposium on Interactive 3D Graphics, 2005, pp. 139-146.
Chen et al., "KNN Matting", IEEE Transactions on Pattern Analysis and Machine Intelligence, Sep. 2013, vol. 35, No. 9, pp. 2175-2188.
Chen et al., "KNN matting", 2012 IEEE Conference on Computer Vision and Pattern Recognition, Jun. 16-21, 2012, Providence, RI, USA, pp. 869-876.
Chen et al., "Image Matting with Local and Nonlocal Smooth Priors" CVPR '13 Proceedings of the 2013 IEEE Conference on Computer Vision and Pattern Recognition, Jun. 23, 2013, pp. 1902-1907.
Chen et al., "Human Face Modeling and Recognition Through Multi-View High Resolution Stereopsis", IEEE Conference on Computer Vision and Pattern Recognition Workshop, Jun. 17-22, 2006, 6 pgs.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic practice", Journal of Vision, vol. 12, No. 5, Article 8, May 25, 2012, pp. 1-14.
Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.
Dainese et al., "Accurate Depth-Map Estimation For 3D Face Modeling", IEEE European Signal Processing Conference, Sep. 4-8, 2005, 4 pgs.
Debevec et al., "Recovering High Dynamic Range Radiance Maps from Photographs", Computer Graphics (ACM SIGGRAPH Proceedings), Aug. 16, 1997, 10 pgs.
Do, Minh N. "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., Immersive Visual Communication, IEEE Signal Processing Magazine, vol. 28, Issue 1, Jan. 2011, DOI: 10.1109/MSP.2010. 939075, Retrieved from: http://minhdo.ece.illinois.edu/publications/ImmerComm_SPM.pdf, pp. 58-66.
Dou et al., "End-to-end 3D face reconstruction with deep neural networks" arXiv:1704.05020v1, Apr. 17, 2017, 10 pgs.
Drouin et al., "Improving Border Localization of Multi-Baseline Stereo Using Border-Cut", International Journal of Computer Vision, Jul. 5, 2006, vol. 83, Issue 3, 8 pgs.
Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.
Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.
Drulea et al., "Motion Estimation Using the Correlation Transform", IEEE Transactions on Image Processing, Aug. 2013, vol. 22, No. 8, pp. 3260-3270, first published May 14, 2013.
Duparre et al., "Microoptical artificial compound eyes—from design to experimental verification of two different concepts", Proc. of SPIE, Optical Design and Engineering II, vol. 5962, Oct. 17, 2005, pp. 59622A-1-59622A-12.
Duparre et al., Novel Optics/Micro-Optics for Miniature Imaging Systems, Proc. of SPIE, Apr. 21, 2006, vol. 6196, pp. 619607-1-619607-15.
Duparre et al., "Micro-optical artificial compound eyes", Bioinspiration & Biomimetics, Apr. 6, 2006, vol. 1, pp. R1-R16.
Duparre et al., "Artificial compound eye zoom camera", Bioinspiration & Biomimetics, Nov. 21, 2008, vol. 3, pp. 1-6.
Duparre et al., "Artificial apposition compound eye fabricated by micro-optics technology", Applied Optics, Aug. 1, 2004, vol. 43, No. 22, pp. 4303-4310.
Duparre et al., "Micro-optically fabricated artificial apposition compound eye", Electronic Imaging—Science and Technology, Prod. SPIE 5301, Jan. 2004, pp. 25-33.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Artificial compound eyes—different concepts and their application to ultra flat image acquisition sensors", MOEMS and Miniaturized Systems IV, Proc. SPIE 5346, Jan. 24, 2004, pp. 89-100.
Duparre et al., "Ultra-Thin Camera Based on Artificial Apposition Compound Eyes", 10th Microoptics Conference, Sep. 1-3, 2004, 2 pgs.
Duparre et al., "Microoptical telescope compound eye", Optics Express, Feb. 7, 2005, vol. 13, No. 3, pp. 889-903.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Microoptical Artificial Compound Eyes—Two Different Concepts for Compact Imaging Systems", 11th Microoptics Conference, Oct. 30-Nov. 2, 2005, 2 pgs.
Eng et al., "Gaze correction for 3D tele-immersive communication system", IVMSP Workshop, 2013 IEEE 11th. IEEE, Jun. 10, 2013.
Fanaswala, "Regularized Super-Resolution of Multi-View Images", Retrieved on Nov. 10, 2012 (Nov. 10, 2012). Retrieved from the Internet at URL :<http://www.site.uottawa.ca/-edubois/theses/Fanaswala_thesis.pdf>, 2009, 163 pgs.
Fang et al., "vol. Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Fangmin et al., "3D Face Reconstruction Based on Convolutional Neural Network", 2017 10th International Conference on Intelligent Computation Technology and Automation, Oct. 9-10, 2017, Changsha, China.
Farrell et al., "Resolution and Light Sensitivity Tradeoff with Pixel Size", Proceedings of the SPIE Electronic Imaging 2006 Conference, Feb. 2, 2006, vol. 6069, 8 pgs.
Farsiu et al., "Advances and Challenges in Super-Resolution", International Journal of Imaging Systems and Technology, Aug. 12, 2004, vol. 14, pp. 47-57.
Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fechteler et al., Fast and High Resolution 3D Face Scanning, IEEE International Conference on Image Processing, Sep. 16-Oct. 19, 2007, 4 pgs.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 49-58.
Fischer et al., "Optical System Design", 2nd Edition, SPIE Press, Feb. 14, 2008, pp. 191-198.
Garg et al., "Unsupervised CNN for Single View Depth Estimation: Geometry to the Rescue", In European Conference on Computer Vision, Springer, Cham, Jul. 2016, 16 pgs.

(56) References Cited

OTHER PUBLICATIONS

Gastal et al., "Shared Sampling for Real-Time Alpha Matting", Computer Graphics Forum, EUROGRAPHICS 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Godard et al., "Unsupervised Monocular Depth Estimation with Left-Right Consistency", In Proceedings of the IEEE Conference on Computer Vision and Pattern Recognition, 2017, 14 pgs.
Goldman et al., "Video Object Annotation, Navigation, and Composition", In Proceedings of UIST 2008, Oct. 19-22, 2008, Monterey CA, USA, pp. 3-12.
Goodfellow et al., "Generative Adversarial Nets, 2014. Generative adversarial nets", In Advances in Neural Information Processing Systems (pp. 2672-2680).
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hacohen et al., "Non-Rigid Dense Correspondence with Applications for Image Enhancement", ACM Transactions on Graphics, vol. 30, No. 4, Aug. 7, 2011, 9 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez et al., "Laser Scan Quality 3-D Face Modeling Using a Low-Cost Depth Camera", 20th European Signal Processing Conference, Aug. 27-31, 2012, Bucharest, Romania, pp. 1995-1999.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Higo et al., "A Hand-held Photometric Stereo Camera for 3-D Modeling", IEEE International Conference on Computer Vision, 2009, pp. 1234-1241.
Hirschmuller, "Accurate and Efficient Stereo Processing by Semi-Global Matching and Mutual Information", IEEE Conference on Computer Vision and Pattern Recognition (CVPR), San Diego, CA, USA, Jun. 20-26, 2005, 8 pgs.
Hirschmuller et al., "Memory Efficient Semi-Global Matching, ISPRS Annals of the Photogrammetry", Remote Sensing and Spatial Information Sciences, vol. 1-3, 2012, XXII ISPRS Congress, Aug. 25-Sep. 1, 2012, Melbourne, Australia, 6 pgs.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pgs.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pgs.
Horisaki et al., "Superposition Imaging for Three-Dimensionally Space-Invariant Point Spread Functions", Applied Physics Express, Oct. 13, 2011, vol. 4, pp. 112501-1-112501-3.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horn et al., "LightShop: Interactive Light Field Manipulation and Rendering", In Proceedings of I3D, Jan. 1, 2007, pp. 121-128.
Hossain et al., "Inexpensive Construction of a 3D Face Model from Stereo Images", IEEE International Conference on Computer and Information Technology, Dec. 27-29, 2007, 6 pgs.
Hu et al., "A Quantitative Evaluation of Confidence Measures for Stereo Vision", IEEE Transactions on Pattern Analysis and Machine Intelligence, vol. 34, Issue 11, Nov. 2012, pp. 2121-2133.
Humenberger ER al., "A Census-Based Stereo Vision Algorithm Using Modified Semi-Global Matching and Plane Fitting to Improve Matching Quality", IEEE Computer Society Conference on Computer Vision and Pattern Recognition Workshops (CVPRW), IEEE, Jun. 13-18, 2010, San Francisco, CA, 8 pgs.
Isaksen et al., "Dynamically Reparameterized Light Fields", In Proceedings of SIGGRAPH 2000, 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Jackson et al., "Large Post 3D Face Reconstruction from a Single Image via Direct Volumetric CNN Regression", arXiv: 1703.07834v2, Sep. 8, 2017, 9 pgs.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), vol. 1, Jun. 17-22, 2006, New York, NY, USA, pp. 371-378.
Joshi, Color Calibration for Arrays of Inexpensive Image Sensors, Mitsubishi Electric Research Laboratories, Inc., TR2004-137, Dec. 2004, 6 pgs.
Joshi et al., "Synthetic Aperture Tracking: Tracking Through Occlusions", ICCV IEEE 11th International Conference on Computer Vision; Publication [online]. Oct. 2007 [retrieved Jul. 28, 2014]. Retrieved from the Internet: <URL: http://ieeexplore.ieee.org/stamp/stamp.jsp?tp=&arnumber=4409032&isnumber=4408819>, pp. 1-8.
Jourabloo, "Large-Pose Face Alignment via CNN-Based Dense 3D Model Fitting", I CCV IEEE 11th International Conference on Computer Vision; Publication [online]. Oct. 2007 [retrieved Jul. 28, 2014]. Retrieved from the Internet: <URL: http://ieeexplore.ieee.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. I-103-I-110.
Keeton, "Memory-Driven Computing", Hewlett Packard Enterprise Company, Oct. 20, 2016, 45 pgs.
Kim, "Scene Reconstruction from a Light Field", Master Thesis, Sep. 1, 2010 (Sep. 1, 2010), pp. 1-72.
Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pages.
Kitamura et al., "Reconstruction of a high-resolution image on a compound-eye image-capturing system", Applied Optics, Mar. 10, 2004, vol. 43, No. 8, pp. 1719-1727.
Kittler et al., "3D Assisted Face Recognition: A Survey of 3D Imaging, Modelling, and Recognition Approaches", Proceedings of the IEEE Computer Society Conference on Computer Vision and Pattern Recognition, Jul. 2005, 7 pgs.
Konolige, Kurt "Projected Texture Stereo", 2010 IEEE International Conference on Robotics and Automation, May 3-7, 2010, pp. 148-155.

(56) References Cited

OTHER PUBLICATIONS

Kotsia et al., "Facial Expression Recognition in Image Sequences Using Geometric Deformation Features and Support Vector Machines", IEEE Transactions on Image Processing, Jan. 2007, vol. 16, No. 1, pp. 172-187.

Krishnamurthy et al., "Compression and Transmission of Depth Maps for Image-Based Rendering", Image Processing, 2001, pp. 828-831.

Kubota et al., "Reconstructing Dense Light Field From Array of Multifocus Images for Novel View Synthesis", IEEE Transactions on Image Processing, vol. 16, No. 1, Jan. 2007, pp. 269-279.

Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.

Lai et al., "A Large-Scale Hierarchical Multi-View RGB-D Object Dataset", Proceedings—IEEE International Conference on Robotics and Automation, Conference Date May 9-13, 2011, 8 pgs., DOI: 10.1109/ICRA.201135980382.

Lane et al., "A Survey of Mobile Phone Sensing", IEEE Communications Magazine, vol. 48, Issue 9, Sep. 2010, pp. 140-150.

Lao et al., "3D template matching for pose invariant face recognition using 3D facial model built with isoluminance line based stereo vision", Proceedings 15th International Conference on Pattern Recognition, Sep. 3-7, 2000, Barcelona, Spain, pp. 911-916.

Lee, "NFC Hacking: The Easy Way", Defcon Hacking Conference, 2012, 24 pgs.

Lee et al., "Electroactive Polymer Actuator for Lens-Drive Unit in Auto-Focus Compact Camera Module", ETRI Journal, vol. 31, No. 6, Dec. 2009, pp. 695-702.

Lee et al., "Nonlocal matting", CVPR 2011, Jun. 20-25, 2011, pp. 2193-2200.

Lee et al., "Automatic Upright Adjustment of Photographs", IEEE Conference on Computer Vision and Pattern Recognition (CVPR), 2012, pp. 877-884.

Lensvector, "How LensVector Autofocus Works", 2010, printed Nov. 2, 2012 from http://www.lensvector.com/overview.html, 1 pg.

Levin et al., "A Closed Form Solution to Natural Image Matting", IEEE Conference on Computer Vision and Pattern Recognition (CVPR), 2006, vol. 1, pp. 61-68.

Levin et al., "Spectral Matting", 2007 IEEE Conference on Computer Vision and Pattern Recognition, Jun. 17-22, 2007, Minneapolis, MN, USA, pp. 1-8.

Levoy, "Light Fields and Computational Imaging", IEEE Computer Society, Sep. 1, 2006, vol. 39, Issue No. 8, pp. 46-55.

Levoy et al., "Light Field Rendering", Proc. ADM SIGGRAPH '96, 1996, pp. 1-12.

Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.

Li et al., "Fusing Images with Different Focuses Using Support Vector Machines", IEEE Transactions on Neural Networks, vol. 15, No. 6, Nov. 8, 2004, pp. 1555-1561.

Lim, "Optimized Projection Pattern Supplementing Stereo Systems", 2009 IEEE International Conference on Robotics and Automation, May 12-17, 2009, pp. 2823-2829.

Liu et al., "Virtual View Reconstruction Using Temporal Information", 2012 IEEE International Conference on Multimedia and Expo, 2012, pp. 115-120.

Lo et al., "Stereoscopic 3D Copy & Paste", ACM Transactions on Graphics, vol. 29, No. 6, Article 147, Dec. 2010, pp. 147:1-147:10.

Ma et al., "Constant Time Weighted Median Filtering for Stereo Matching and Beyond", ICCV '13 Proceedings of the 2013 IEEE International Conference on Computer Vision, IEEE Computer Society, Washington DC, USA, Dec. 1-8, 2013, 8 pgs.

Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.

McGuire et al., "Defocus video matting", ACM Transactions on Graphics (TOG)—Proceedings of ACM SIGGRAPH 2005, vol. 24, Issue 3, Jul. 2005, pp. 567-576.

Medioni et al., "Face Modeling and Recognition in 3-D", Proceedings of the IEEE International Workshop on Analysis and Modeling of Faces and Gestures, 2013, 2 pgs.

Merkle et al., "Adaptation and optimization of coding algorithms for mobile 3DTV", Mobile3DTV Project No. 216503, Nov. 2008, 55 pgs.

Michael et al., "Real-time Stereo Vision: Optimizing Semi-Global Matching", 2013 IEEE Intelligent Vehicles Symposium (IV), IEEE, Jun. 23-26, 2013, Australia, 6 pgs.

Milella et al., "3D reconstruction and classification of natural environments by an autonomous vehicle using multi-baseline stereo", Intelligent Service Robotics, vol. 7, No. 2, Mar. 2, 2014, pp. 79-92.

Min et al., "Real-Time 3D Face Identification from a Depth Camera", Proceedings of the IEEE International Conference on Pattern Recognition, Nov. 11-15, 2012, 4 pgs.

Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.

Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pgs.

Muehlebach, "Camera Auto Exposure Control for VSLAM Applications", Studies on Mechatronics, Swiss Federal Institute of Technology Zurich, Autumn Term 2010 course, 67 pgs.

Nayar, "Computational Cameras: Redefining the Image", IEEE Computer Society, Aug. 14, 2006, pp. 30-38.

Ng, "Digital Light Field Photography", Thesis, Jul. 2006, 203 pgs.

Ng et al., "Super-Resolution Image Restoration from Blurred Low-Resolution Images", Journal of Mathematical Imaging and Vision, 2005, vol. 23, pp. 367-378.

Ng et al., "Light Field Photography with a Hand-held Plenoptic Camera", Stanford Tech Report CTSR 2005-02, Apr. 20, 2005, pp. 1-11.

Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.

Nguyen et al., "Error Analysis for Image-Based Rendering with Depth Information", IEEE Transactions on Image Processing, vol. 18, Issue 4, Apr. 2009, pp. 703-716.

Nishihara, H.K. "Prism: A Practical Real-Time Imaging Stereo Matcher", Massachusetts Institute of Technology, A.I. Memo 780, May 1984, 32 pgs.

Nitta et al., "Image reconstruction for thin observation module by bound optics by using the iterative backprojection method", Applied Optics, May 1, 2006, vol. 45, No. 13, pp. 2893-2900.

Nomura et al., "Scene Collages and Flexible Camera Arrays", Proceedings of Eurographics Symposium on Rendering, Jun. 2007, 12 pgs.

Park et al., "Super-Resolution Image Reconstruction", IEEE Signal Processing Magazine, May 2003, pp. 21-36.

Park et al., "Multispectral Imaging Using Multiplexed Illumination", 2007 IEEE 11th International Conference on Computer Vision, Oct. 14-21, 2007, Rio de Janeiro, Brazil, pp. 1-8.

Park et al., "3D Face Reconstruction from Stereo Video", First International Workshop on Video Processing for Security, Jun. 7-9, 2006, Quebec City, Canada, 2006, 8 pgs.

Parkkinen et al., "Characteristic Spectra of Munsell Colors", Journal of the Optical Society of America A, vol. 6, Issue 2, Feb. 1989, pp. 318-322.

Perwass et al., "Single Lens 3D-Camera with Extended Depth-of-Field", printed from www.raytrix.de, Jan. 22, 2012, 15 pgs.

Pham et al., "Robust Super-Resolution without Regularization", Journal of Physics: Conference Series 124, Jul. 2008, pp. 1-19.

(56) References Cited

OTHER PUBLICATIONS

Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds from Real World Events", Proc. of IEEE Visualization '97, Phoenix, Arizona, Oct. 19-24, 1997, pp. 277-283, 552.
Ranjan et al., "HyperFace: A Deep Multi-Task Learning Framework for Face Detection, Landmark Localization, Pose Estimation, and Gender Recognition", May 11, 2016 (May 11, 2016), pp. 1-16.
Rhemann et al, "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robert et al., "Dense Depth Map Reconstruction: A Minimization and Regularization Approach which Preserves Discontinuities", European Conference on Computer Vision (ECCV), pp. 439-451, (1996).
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Rusinkiewicz et al., "Real-Time 3D Model Acquisition", ACM Transactions on Graphics (TOG), vol. 21, No. 3, Jul. 2002, pp. 438-446.
Saatci et al., "Cascaded Classification of Gender and Facial Expression using Active Appearance Models", IEEE, FGR'06, 2006, 6 pgs.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Seitz et al., "Plenoptic Image Editing", International Journal of Computer Vision 48, Conference Date Jan. 7, 1998, 29 pgs., DOI: 10.1109/ICCV.1998.710696 • Source: DBLP Conference: Computer Vision, Sixth International Conference.
Shechtman et al., "Increasing Space-Time Resolution in Video", European Conference on Computer Vision, LNCS 2350, May 28-31, 2002, pp. 753-768.
Shotton et al., "Real-time human pose recognition in parts from single depth images", CVPR 2011, Jun. 20-25, 2011, Colorado Springs, CO, USA, pp. 1297-1304.
Shum et al., "Pop-Up Light Field: An Interactive Image-Based Modeling and Rendering System", Apr. 2004, ACM Transactions on Graphics, vol. 23, No. 2, pp. 143-162, Retrieved from http://131.107.65.14/en-us/um/people/jiansun/papers/PopupLightField_TOG.pdf on Feb. 5, 2014.
Shum et al., "A Review of Image-based Rendering Techniques", Visual Communications and Image Processing 2000, May 2000, 12 pgs.
Sibbing et al., "Markerless reconstruction of dynamic facial expressions", 2009 IEEE 12th International Conference on Computer Vision Workshops, ICCV Workshop: Kyoto, Japan, Sep. 27-Oct. 4, 2009, Institute of Electrical and Electronics Engineers, Piscataway, NJ, Sep. 27, 2009 (Sep. 27, 2009), pp. 1778-1785.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Thin observation module by bound optics (TOMBO): concept and experimental verification", Applied Optics, Apr. 10, 2001, vol. 40, No. 11, pp. 1806-1813.
Tanida et al., "Color imaging with an integrated compound imaging system", Optics Express, Sep. 8, 2003, vol. 11, No. 18, pp. 2109-2117.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the future?", American Cinematographer, vol. 77, No. 9, Sep. 1996, pp. 93-100.
Tseng et al., "Automatic 3-D depth recovery from a single urban-scene image", 2012 Visual Communications and Image Processing, Nov. 27-30, 2012, San Diego, CA, USA, pp. 1-6.
Uchida et al., 3D Face Recognition Using Passive Stereo Vision, IEEE International Conference on Image Processing 2005, Sep. 14, 2005, 4 pgs.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Using Plane + Parallax for Calibrating Dense Camera Arrays", IEEE Conference on Computer Vision and Pattern Recognition (CVPR), 2004, 8 pgs.
Vaish et al., "Synthetic Aperture Focusing Using a Shear-Warp Factorization of the Viewing Transform", IEEE Workshop on A3DISS, CVPR, 2005, 8 pgs.
Van der Wal et al., "The Acadia Vision Processor", Proceedings Fifth IEEE International Workshop on Computer Architectures for Machine Perception, Sep. 13, 2000, Padova, Italy, pp. 31-40.
Veilleux, "CCD Gain Lab: The Theory", University of Maryland, College Park-Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.

(56) References Cited

OTHER PUBLICATIONS

Venkataraman et al., "PiCam: An Ultra-Thin High Performance Monolithic Camera Array", ACM Transactions on Graphics (TOG), ACM, US, vol. 32, No. 6, Nov. 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008, 5 pgs.
Wang, "Calculation of Image Position, Size and Orientation Using First Order Properties", Dec. 29, 2010, OPTI521 Tutorial, 10 pgs.
Wang et al., "Soft scissors: an interactive tool for realtime high quality matting", ACM Transactions on Graphics (TOG)—Proceedings of ACM.
SIGGRAPH 2007, vol. 26, Issue 3, Article 9, Jul. 2007, 6 pg., published Aug. 5, 2007.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Facial Feature Point Detection: A Comprehensive Survey", arXiv: 1410.1037v1, Oct. 4, 2014, 32 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, Mar. 11, 2005, vol. 5674, 12 pgs.
Widanagamaachchi et al., "3D Face Recognition from 2D Images: A Survey", Proceedings of the International Conference on Digital Image Computing: Techniques and Applications, Dec. 1-3, 2008, 7 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, pp. 59622C-1-59622C-11.
Wu et al., "A virtual view synthesis algorithm based on image inpainting", 2012 Third International Conference on Networking and Distributed Computing, Hangzhou, China, Oct. 21-24, 2012, pp. 153-156.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Yang et al., "Superresolution Using Preconditioned Conjugate Gradient Method", Proceedings of SPIE—The International Society for Optical Engineering, Jul. 2002, 8 pgs.
Yang et al., "A Real-Time Distributed Light Field Camera", Eurographics Workshop on Rendering (2002), published Jul. 26, 2002, pp. 1-10.
Yang et al., Model-based Head Pose Tracking with Stereovision, Microsoft Research, Technical Report, MSR-TR-2001-102, Oct. 2001, 12 pgs.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zbontar et al., Computing the Stereo Matching Cost with a Convolutional Neural Network, CVPR, 2015, pp. 1592-1599.
Zhang et al., "A Self-Reconfigurable Camera Array", Eurographics Symposium on Rendering, published Aug. 8, 2004, 12 pgs.
Zhang et al., "Depth estimation, spatially variant image registration, and super-resolution using a multi-lenslet camera", proceedings of SPIE, vol. 7705, Apr. 23, 2010, pp. 770505-770505-8, XP055113797 ISSN: 0277-786X, DOI: 10.1117/12.852171.
Zhang et al., "Spacetime Faces: High Resolution Capture for Modeling and Animation", ACM Transactions on Graphics, 2004, 11pgs.
Zheng et al., "Balloon Motion Estimation Using Two Frames", Proceedings of the Asilomar Conference on Signals, Systems and Computers, IEEE, Comp. Soc. Press, US, vol. 2 of 2, Nov. 4, 1991, pp. 1057-1061.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Zomet et al., "Robust Super-Resolution", IEEE, 2001, pp. 1-6.
"File Formats Version 6", Alias Systems, 2004, 40 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
"Exchangeable image file format for digital still cameras: Exif Version 2.2"_, Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.
Systems and Equipment, JEITA CP-3451, Apr. 2002, Retrieved from: http://www.exif.org/Exif2-2,PDF, 154 pgs.
Callenberg, Clara et al., "Snapshot Difference Imaging using Time-of-Flight Sensors," arXiv:1705.07108v1 [cs.CV] May 19, 2017, 10 pages.
Mahmoud, Ali H., "Utilizing radiation for smart robotic applications using visible, thermal, and polarization images," 2014, Electronic Theses and Dissertations. Paper 888, https://doi.org/10.18297/etd/888, 143 pages.
Shinoda, Kazuma, Yasuo Ohtera, and Madoka Hasegawa. "Snapshot multispectral polarization imaging using a photonic crystal filter array." Optics Express 26.12 (2018): 15948-15961.
International Search Report and Written Opinion in International Appln. No. PCT/US2022/017765, dated Jun. 16, 2022, 29 pages.
Shen et al., "Multi-modal and multi-spectral registration for natural images," European Conference on Computer Vision, Sep. 2014, pp. 309-324.
International Preliminary Report on Patentability in International Appln. No. PCT/US2022/017765, dated Sep. 21, 2023, 11 pages.

\* cited by examiner

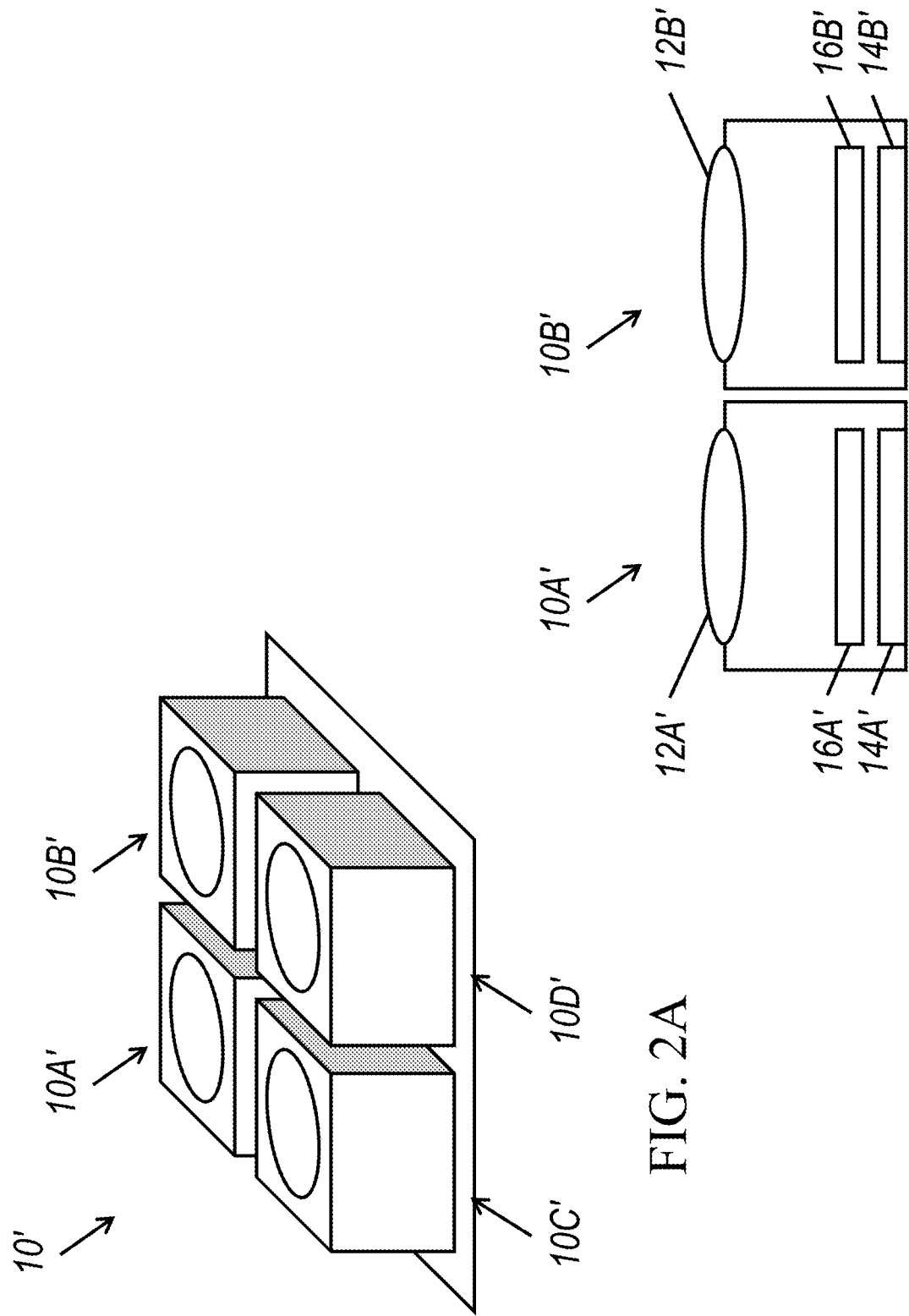

MULTI-MODAL AND MULTI-SPECTRAL STEREO CAMERA ARRAYS

FIELD

Aspects of embodiments of the present disclosure relate to imaging systems including mixed-modality camera arrays.

BACKGROUND OF THE INVENTION

A camera array generally includes a plurality of cameras, where each of the cameras may have a separate lens with a separate optical axis. The cameras of the camera array may point in the same direction, such as with having optical axes that are substantially parallel to one another, or having optical axes that all substantially converge at a particular point.

A stereo camera system includes two or more cameras that are spaced apart from another along a baseline and that have optical axes that may be substantially parallel to one another or that may substantially converge at a particular point in front of the cameras. Stereo cameras may be used to provide binocular vision, thereby capturing of sets of images that can provide a sense of depth when viewed by a person. Depth-from-stereo algorithms may also be used to compute the depths of objects depicted in the captured images (where "depths" refer to the distances of the objects from the camera system at the time of capture) based on computing the disparity (e.g., parallax shift) between correspondences (e.g., portions of the images depicting the same physical surfaces) detected between the images captured by separate cameras (a stereo pair) of the stereo camera system.

SUMMARY OF THE INVENTION

Aspects of embodiments of the present disclosure relate to mixed-modality camera arrays that enable the capture and detection of correspondences between images captured by arrays of a stereo camera array system that includes multiple camera arrays.

According to one embodiment, a stereo camera array system includes: a first camera array at a first viewpoint including: a first camera configured to capture images in a first modality, the first modality being viewpoint-independent; and a second camera configured to capture images in a second modality different from the first modality; and a second camera array at a second viewpoint spaced apart along a first baseline from the first camera array at the first viewpoint, the second camera array including: a first camera configured to capture images in the first modality; and a second camera configured to capture images in the second modality.

The second camera of the first camera array may include a linear polarization filter at a first angle of linear polarization, the first camera array may further include: a third camera including a linear polarization filter at a second angle of linear polarization; and a fourth camera including a linear polarization filter at a third angle of linear polarization, the second camera of the second camera array may include a linear polarization filter at the first angle of linear polarization, and the second camera array may further include: a third camera including a linear polarization filter at the second angle of linear polarization; and a fourth camera including a linear polarization filter at the third angle of linear polarization.

The first camera array may further include: a fifth camera including a linear polarization filter at a fourth angle of linear polarization, and the second camera array may further include: a fifth camera including a linear polarization filter at the fourth angle of linear polarization.

The first modality may be: non-polarized visible; non-polarized near-infrared; non-polarized thermal; non-polarized ultraviolet; lidar; or radar.

The second modality different from the first modality may be: polarized visible; polarized near-infrared; polarized thermal; or polarized ultraviolet.

The stereo camera array system may further include: a third camera array spaced apart from the first camera array along a second baseline different from the first baseline, the third camera array including: a first camera configured to capture images in the first modality; and a second camera configured to capture images in the second modality, the second camera of the third camera array may include a linear polarization filter at the first angle of linear polarization, and the third camera array may further include: a third camera including a linear polarization filter at the second angle of linear polarization; and a fourth camera including a linear polarization filter at the third angle of linear polarization.

The stereo camera array system may further include: a third camera array spaced apart from the first camera array along a second baseline different from the first baseline, the third camera array including: a first camera configured to capture images in the first modality; and a second camera configured to capture images in the second modality.

The first modality may be: non-polarized visible; non-polarized near-infrared; non-polarized thermal; non-polarized ultraviolet; lidar; or radar.

The second modality may be: polarized visible; non-polarized visible; polarized near-infrared; non-polarized near-infrared; polarized thermal; non-polarized thermal; polarized ultraviolet; non-polarized ultraviolet; lidar; or radar.

The stereo camera array system may further include a processing circuit configured to: control the first camera array and the second camera array to capture images concurrently; receive a first plurality of images from the first camera array, the first plurality of images including: a first image in the first modality from the first camera of the first camera array; and a second image in the second modality from the second camera of the first camera array; and receive a second plurality of images from the second camera array, the second plurality of images including: a first image in the first modality from the first camera of the second camera array; and a second image in the second modality from the second camera of the second camera array.

The processing circuit may be further configured to: fuse the first plurality of images received from the first camera array; fuse the second plurality of images received from the second camera array; compute a plurality of correspondences between: the first image of the first plurality of images; and the first image of the second plurality of images; and identify a plurality of locations of the correspondences in: the second image of the first plurality of images; and the second image of the second plurality of images.

The processing circuit may be further configured to: control the first camera array and the second camera array in accordance with: a plurality of first capture parameters controlling the first camera of the first camera array; a plurality of second capture parameters controlling the second camera of the first camera array; a plurality of third capture parameters controlling the first camera of the second camera array; and a plurality of fourth capture parameters controlling the second camera of the second camera array, the first capture parameters, the second capture parameters, the third capture parameters, and the fourth capture parameters may be independently controlled in accordance with a joint evaluation of a scene based on information from: the first camera of the first camera array; the second camera of the first camera array; the first camera of the second camera array; and the second camera of the second camera array.

The information may include images previously captured by the first camera of the first camera array, the second camera of the first camera array, the first camera of the second camera array, and the second camera of the second camera array.

The stereo camera array system may further include a light projection system.

The light projection system may include a first light projector configured to emit light detectable in the first modality and not detectable in the second modality.

The light projection system may further include a second light projector configured to emit light detectable in the second modality and not detectable in the first modality.

The light projection system may include: a first light projector configured to emit light detectable in the first modality; and a second light projector configured to emit light detectable in the second modality, and the stereo camera array system may further include a processing circuit configured to: synchronize emitting light by the first light projector with capturing images by the first camera of the first camera array and the first camera of the second camera array; and synchronize emitting light by the second light projector with capturing images by the second camera of the first camera array and the second camera of the second camera array.

According to one embodiment of the present disclosure, a method for capturing stereo images includes: controlling, by a processing circuit, a stereo camera array system to capture a plurality of images, the stereo camera array system including: a first camera array at a first viewpoint including: a first camera configured to capture images in a first modality, the first modality being viewpoint-independent; and a second camera configured to capture images in a second modality different from the first modality; and a second camera array at a second viewpoint spaced apart along a first baseline from the first camera array at the first viewpoint, the second camera array including: a first camera configured to capture images in the first modality; and a second camera configured to capture images in the second modality, the plurality of images including: a first plurality of images captured by the first camera array; and a second plurality of images captured by the second camera array; and detecting, by the processing circuit, correspondences between the first plurality of images and the second plurality of images.

The method may further include: fusing the first plurality of images received from the first camera array; and fusing the second plurality of images received from the second camera array.

The first plurality of images may include: a first image captured in the first modality from the first viewpoint; and a second image captured in the second modality from the first viewpoint, the second plurality of images may include: a third image captured in the first modality from the second viewpoint; a fourth image captured in the second modality from the second viewpoint, and the method may further include detecting correspondences by detecting correspondences between: the first image and the third image; and the second image and the fourth image.

The first image and the second image may be mapped to a first common coordinate space, the third image and the fourth image may be mapped to a second common coordinate space, and the correspondences between the second image and the fourth image may be detected by: identifying locations of a plurality of correspondences detected between the first image in the first common coordinate space and the third image in the second common coordinate space; and mapping the locations of the correspondences to the second image in the first common coordinate space and the fourth image in the second common coordinate space.

The method may further include controlling the first camera array and the second camera array in accordance with: a plurality of first capture parameters controlling the first camera of the first camera array; a plurality of second capture parameters controlling the second camera of the first camera array; a plurality of third capture parameters controlling the first camera of the second camera array; and a plurality of fourth capture parameters controlling the second camera of the second camera array, the first capture parameters, the second capture parameters, the third capture parameters, and the fourth capture parameters may be independently controlled in accordance with a joint evaluation of a scene based on information from: the first camera of the first camera array; the second camera of the first camera array; the first camera of the second camera array; and the second camera of the second camera array.

The information may include images previously captured by the first camera of the first camera array, the second camera of the first camera array, the first camera of the second camera array, and the second camera of the second camera array.

The second camera of the first camera array may include a linear polarization filter at a first angle of linear polarization, the first camera array may further include: a third camera including a linear polarization filter at a second angle of linear polarization; and a fourth camera including a linear polarization filter at a third angle of linear polarization, the second camera of the second camera array may include a linear polarization filter at the first angle of linear polarization, and the second camera array may further include: a third camera including a linear polarization filter at the second angle of linear polarization; and a fourth camera including a linear polarization filter at the third angle of linear polarization.

The first camera array may further include: a fifth camera including a linear polarization filter at a fourth angle of linear polarization, and the second camera array may further include: a fifth camera including a linear polarization filter at the fourth angle of linear polarization.

The stereo camera array system may further include: a third camera array spaced apart from the first camera array along a second baseline different from the first baseline, the third camera array including: a first camera configured to capture images in the first modality; and a second camera configured to capture images in the second modality.

The second camera of the third camera array may include a linear polarization filter at the first angle of linear polarization, and the third camera array may further include: a third camera including a linear polarization filter at the second angle of linear polarization; and a fourth camera including a linear polarization filter at the third angle of linear polarization.

The first modality may be: non-polarized visible; non-polarized near-infrared; non-polarized thermal; non-polarized ultraviolet; lidar; or radar.

The second modality different from the first modality may be: polarized visible; polarized near-infrared; polarized thermal; or polarized ultraviolet.

The first modality may be: non-polarized visible; non-polarized near-infrared; non-polarized thermal; non-polarized ultraviolet; lidar; or radar.

The second modality may be: polarized visible; non-polarized visible; polarized near-infrared; non-polarized near-infrared; polarized thermal; non-polarized thermal; polarized ultraviolet; non-polarized ultraviolet; lidar; or radar.

The stereo array camera system may further include a light projection system.

The light projection system may include a first light projector configured to emit light detectable in the first modality and not detectable in the second modality.

The light projection system may further include a second light projector configured to emit light detectable in the second modality and not detectable in the first modality.

The light projection system may include: a first light projector configured to emit light detectable in the first modality; and a second light projector configured to emit light detectable in the second modality, and the method may further include: synchronizing emitting light by the first light projector with capturing images by the first camera of the first camera array and the first camera of the second camera array; and synchronizing emitting light by the second light projector with capturing images by the second camera of the first camera array and the second camera of the second camera array.

BRIEF DESCRIPTION OF THE DRAWINGS

The accompanying drawings, together with the specification, illustrate exemplary embodiments of the present invention, and, together with the description, serve to explain the principles of the present invention.

FIG. 2A is a perspective view of a camera array according to one embodiment of the present disclosure.

FIG. 2B is a cross sectional view of a portion of a camera array according to one embodiment of the present disclosure.

DETAILED DESCRIPTION OF THE INVENTION

Figure 1:
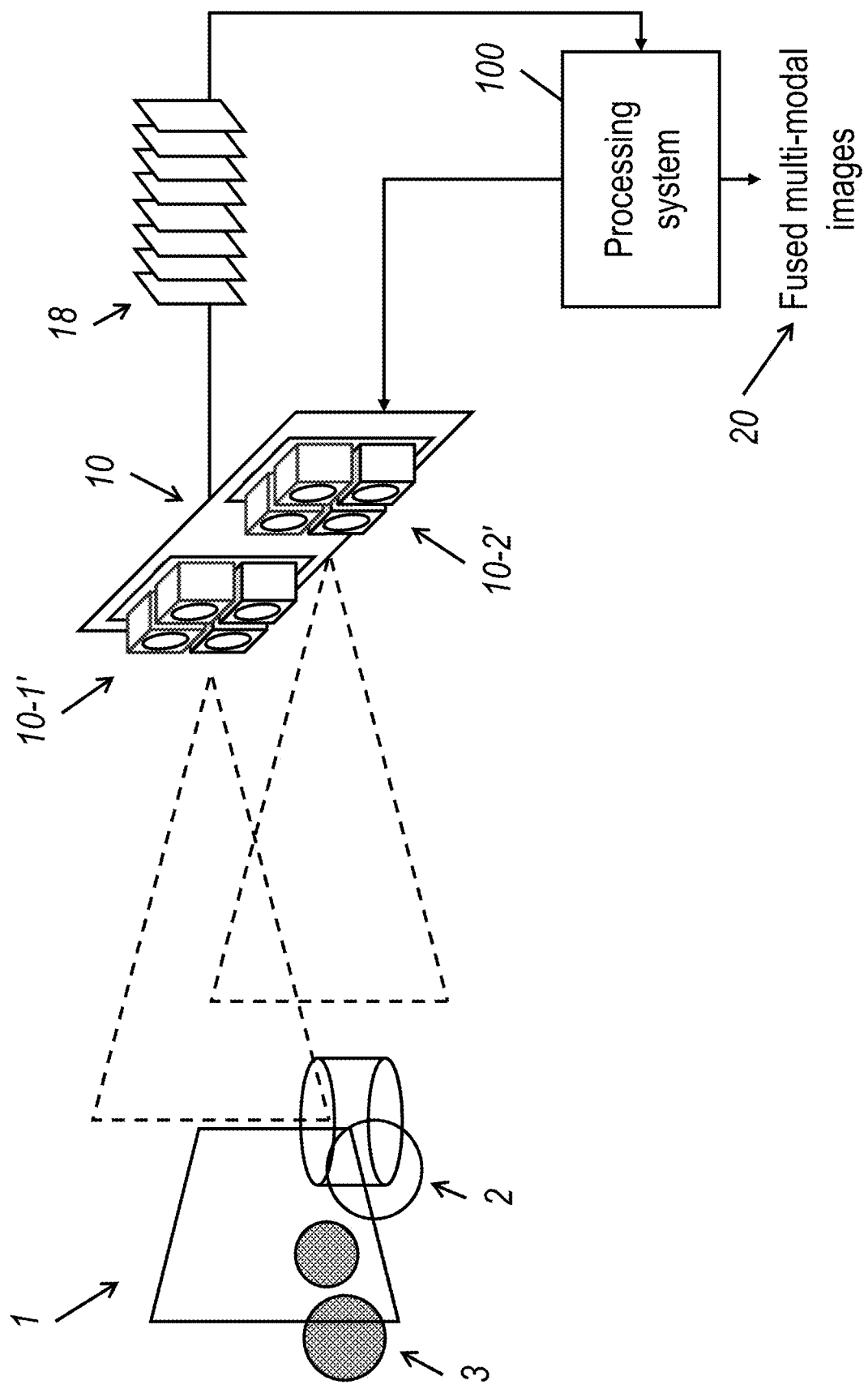
FIG. 1 is a schematic block diagram of an imaging system including a stereo camera array system according to embodiments of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present disclosure relate to multi-modality and multi-spectral camera array systems, such as mixed-modality stereo camera array systems. Some applications of stereo camera systems may benefit from the use of imaging modalities other than visible light. Examples of other imaging modalities and spectra include polarization (e.g., a camera with a polarization filter or polarization mask), visible, near infrared, far infrared, shortwave infrared (SWIR), longwave infrared (LWIR) or thermal, ultraviolet, radar, lidar, and the like.

The combination of a depth camera using camera arrays that include a visible light or infrared light camera in combination with a polarization camera may be of particular interest in certain applications because polarization cues from a polarization camera can be used to compute surface normals (e.g., the angle or slope of a surface with respect to the camera) and therefore these surface normals can be used to refine or smooth the depth map or 3D shape reconstructed from the stereo images captured by the visible light (or infrared) camera. This approach also enables a completely passive approach (e.g., using ambient light, without using additional active illumination, such as from a structured light projector of the camera system) to capture high quality 3D scans of objects.

For example, the work described in Kadambi, Achuta, et al. "Polarized 3D: High-Quality Depth Sensing with Polarization Cues." *Proceedings of the IEEE International Conference on Computer Vision.* 2015. explored how coarse depth maps can be enhanced by using the shape information from polarization cues, in particular proposing a framework to combine surface normals from polarization (hereafter polarization normals) with an aligned depth map. In the Kadambi et al. paper, an initial aligned depth map was acquired using a time-of-flight 3D scanner (a Microsoft® Kinect® II). The work focused on how one could use polarization cues to enhance the acquired depth map, but did not perform a detailed investigation on how these depth maps could be acquired.

While an active illumination-based approach for 3D scanning, such as time-of-flight 3D scanning, may be suitable in some scenarios, a completely passive approach to acquiring robust and high-quality depth information is a desirable feature of 3D scanners, due to benefits such as reduced energy consumption and reduction in potential interference with other light sensitive devices in an environment (e.g., no powered active illumination source to emit visible or invisible light patterns).

For example, stereo camera systems provide one approach for implementing passive 3D scanning systems. A stereo camera system includes two or more cameras that are spaced apart from one another, thereby placing the cameras at different viewpoints with respect to a scene that is being imaged by the stereo camera system. The spatial vector between a given pair of cameras in a stereo camera system is referred to as a "baseline." The cameras generally have substantially overlapping fields of view (e.g., with substantially parallel optical axes, or where the optical axes substantially intersect at a point), such that the substantially the same objects of the scene are imaged by the different cameras of the stereo camera system.

Finding correspondences between images captured by a stereo camera system relates to determining which parts of one image correspond to which parts of another image. For example, when a stereo camera system images a scene containing a cube, finding correspondences may include determining which portions of the two images depict the same corner of the cube. Determining the locations of correspondences in different images captured by the stereo camera system may be used, for example, to stitch the separate images together (thereby creating an image with a wider field of view than the images captured by the individual cameras). Another application of detecting correspondences is to perform three-dimensional (3D) reconstruction of a scene, where the disparity of the correspondences (e.g., differences in the locations of the correspondences within their respective images) due to parallax shift is used to estimate a distance between the camera and the surface of the object in the scene (also referred to as a "depth" of the surface)—e.g., where larger disparities indicate surfaces that are closer to the camera and smaller disparities indicate surfaces that are farther from the camera. These 3D reconstructions of a scene may also be referred to as depth maps that include point clouds (e.g., collections of 3D points representing the detected locations of surfaces in the scene).

Techniques for finding correspondences between images include block matching along epipolar lines (e.g., lines that are parallel to the baseline between the cameras of a stereo pair) using similarity measures such as sum-of-squared-differences (SSD), dense feature descriptors, deep learning descriptors, and the like.

Generally, algorithms for detecting correspondences between stereo pairs perform better on images where the surfaces of the object in the scene exhibit sufficient texture that can be matched between the images. Typically, monochrome or color intensity images captured by visible light cameras or infrared cameras may be used to detect these correspondences. In some cases, a camera system includes a projection source or light projector configured to emit light having a pattern (e.g., structured light or a dot pattern) onto the scene (thereby making the stereo camera an active system), which may improve the ability to detect correspondences in surfaces that would otherwise lack texture (such as a flat, painted surface of having uniform color) or that have a confusing texture (such as a repeating pattern in the case of some printed textiles and wallpaper). Stereo camera systems that do not use supplemental light projectors and that rely on ambient or environmental sources of light are typically referred to as passive stereo camera systems.

As noted above, a depth map can be refined by polarization normals computed in accordance with the techniques described in Kadambi et al. using polarization images captured of the scene. To compute these polarization normals, the approach used in Kadambi et al. highlighted the variation of image intensity at a given point as a function of the polarizer attributes (linear polarization angle of the polarization filter of the camera) as a sinusoidal function. Estimating the amplitude, phase, and offset of the sinusoidal function requires sampling the scene with at least three distinct values of the polarizer filter (e.g., three different linear polarization angles). A camera system can capture the scene with three distinct polarizer filter angles in a time-multiplexed manner by rotating the polarizer filter between captures (e.g., where each camera of the stereo camera system has a rotatable polarizer filter), but such an approach would be limited to imaging substantially static scenes.

One option for simultaneously capturing multiple images at different polarizations is to use a camera with a Sony® IMX250MZR sensor, which has a polarizing filter element overlaid on top of the pixel to create a per-pixel polarizing filter. One example of a polarization camera using the Sony® IMX250MZR sensor is the Blackfly® S Polarization Camera produced by FLIR® Systems, Inc. of Wilsonville, Oregon By creating a 2×2 grid of these polarizing filters over the entire sensor array, one can capture up to four polarizing channels for each image captured with a camera using the Sony® IMX250MZR sensor. However, the quality of the polarization images captured are attenuated by potential electrical and optical crosstalk between adjacent pixels. In addition, the extinction ratios of the polarization filter on the Sony® IMX250MZR sensor are generally not very high. Extinction ratio is highly relevant when dealing with scenes of high dynamic range that need to be robustly scanned in the acquisition of 3D information. Therefore, using a sensor such as Sony IMX250MZR may limit the choice of scenes and applications in which it can be applied.

Another approach, applied in some embodiments of the present disclosure, is to capture these three or more polarization images (corresponding to different angles of linear polarization) substantially simultaneously or concurrently, through the use of a camera array that includes three or more polarization cameras having different polarization filters (e.g., polarization filters at different relative polarization angles). According to some embodiments, an image fusion algorithm (e.g., implemented in software or firmware) merges these disparate images after estimating the per-pixel parallax between the multiple viewpoints. While this approach has the overhead of software computational requirements, it enables the capture of high quality polarization images without the mitigating factors of pixel crosstalk affecting the polarization cues, as might be encountered using other techniques such as the Sony® IMX250MZR sensor.

As such, some aspects of embodiments of the present disclosure relate to camera system architectures tailored for performing 3D scans, including architectures capable of completely passive capture of 3D scans. These architectures include camera system architectures that combine stereo disparity estimation with multi-modal and multi-spectral fusion to achieve a completely passive 3D sensing process. Some aspects of embodiments relate to controlling of parameters of the multi-modal and multi-spectral images more holistically (e.g., jointly controlling parameters) than would otherwise be possible in comparative camera system architectures. Architectures in accordance with embodiments that include polarization cameras may also further refine this coarse 3D scan or depth map using per-pixel polarization cues for each of those pixels. In addition, camera architectures according to embodiments of the present disclosure are robust to glare and are able to capture scenes (e.g., environments containing one or more objects) with high dynamic range (HDR). Using a heterogeneous array of cameras in accordance with embodiments of the present disclosure provides more robust pixel correspondence estimation at least because surfaces that lack detectable texture in one modality may have detectable texture in another modality. For example, a reflective surface may appear substantially uniform in an image captured by a visible light camera without a polarizing filter, but may have detectable texture (e.g., show surface patterns) when captured by a polarization camera.

Some imaging modalities, such as polarization imaging, are viewpoint-dependent, meaning that the intensity of the light changes based on position. For example, a stereo pair of a stereo camera system including two polarization cameras spaced apart along a baseline may capture images where the intensities of pixels in corresponding regions may differ significantly due to the viewpoint-dependent physics of polarization imaging. This viewpoint dependency may cause difficulties in detecting correspondences between images of a stereo pair, because these techniques generally assume brightness constancy across the two viewpoints. In other words, it is assumed that a brightness of an object or surface that is captured by two different cameras located at different viewpoints (as in a stereo pair) would register the image of that object or surface at an intensity level that is approximately the same (within imager tolerances, such as image sensor response functions, noise, optics manufacturing tolerances, and the like). However, brightness constancy cannot be assumed in the case of polarization imaging, where the same surface may look very different between the different viewpoints of the stereo camera system. This is because polarization filters have an effect on the intensity of the captured image that is a function of not just the camera viewpoint but also of the amount of ambient illumination and specular reflectivity of the materials on the object. As a result, attempting to detect correspondences in polarization images may have a high error rate due to the viewpoint dependency thereby reducing the quality or accuracy of the output of computer vision systems. For example, these may be manifested as high noise in a depth map computed from attempting to detect correspondences directly from these polarization images.

Other imaging modalities may have problems with lower levels of resolution, or lack of distinctive surface texture. For example, thermal imaging may generate images with relatively little texture across surfaces that emit substantially uniform thermal radiation (e.g., surfaces of substantially uniform temperature).

In view of the above, some aspects of embodiments of the present disclosure relate to a stereo camera array system that is built from combining multiple camera arrays. Instead of a single instance of a camera for the left and right camera in a stereo pair, some embodiments of the present disclosure use a first array of cameras for the left member of the stereo pair, and a second array of cameras for the right member of the stereo pair. In some cases, the "first array of cameras" and the "second array of cameras" may be referred to as a "first sub-array" and a "second sub-array," as the combination of the first array of cameras and the second array of cameras is also an array of cameras. Nevertheless, for the sake of clarity, the term "array" will generally be used herein to refer to a group of cameras that are closely grouped around a particular pose (e.g., a particular coordinates (x, y) with respect to the stereo camera array system as a whole) and/or having a same viewpoint or substantially same viewpoint. For example, the cameras of the first array of cameras or first camera array may have a substantially same first viewpoint (e.g., at coordinates $(x_1, y_1, z_1)$) of a scene, and the cameras of the second array of cameras (or second camera array) may substantially same second viewpoint (e.g., at coordinates $(x_2, y_2, z_2)$) of the scene due to being spaced apart from the first array of cameras. Each camera array is configured to perform multi-spectral and/or multimodal imaging. In some embodiments, each of the multiple cameras (or camera modules) are configured to capture images in multiple modalities (e.g., with different polarizing filters and without a polarizing filter, and the like, and including other forms of imaging including radar, lidar, and the like) and/or multiple spectra (e.g., different portions of the electromagnetic spectrum). Each camera in the camera array includes an imaging system, such as an optical imaging system that includes the combination of a lens system and an imaging sensor such as a complementary metal oxide semiconductor (CMOS) sensor in the case of optical imaging modalities such as visible light, infrared, and thermal modalities, or other imaging systems, such as a phased array in the case of a radar imaging system.

While some of the cameras in camera array may implement imaging modalities that are viewpoint-dependent, in some embodiments of the present disclosure, at least one of the cameras in each camera array is substantially viewpoint-independent.

As used herein, the term "viewpoint-independent" imaging refers to imaging modalities where the intensity of light (or magnitude of another detected signal) is substantially independent of the viewpoint. These may also be referred to imaging modalities that comply with a brightness constancy assumption. As used herein, a viewpoint-independent imaging modality refers to a modality in which the measured intensity of light reflecting off substantially diffuse surfaces imaged in a scene is viewpoint-independent. These viewpoint-independent imaging modalities may include, for example, a camera (e.g., visible light or infrared camera) that does not have a polarizing filter in its optical path. In practice, most surfaces in the real world do not exhibit ideal diffuse (e.g., Lambertian) reflectance and therefore will exhibit some degree of viewpoint dependence. For example, highly reflective surfaces (e.g., mirrors) and glossy or shiny surfaces (e.g., polished paint) may exhibit viewpoint-dependent reflections and specular highlights. Nevertheless, these imaging modalities will still be considered herein to be viewpoint-independent or compliant with the brightness constancy assumption.

Accordingly, some embodiments of the present disclosure relate to a camera array that includes multiple cameras that are calibrated with respect to one another, and where the camera array includes a viewpoint-independent camera. Here, camera calibration involves determining mappings between pixels of images in different cameras (different cameras having different modalities or spectra) of the camera array, where camera calibration (also referred to as geometric camera calibration, camera resectioning, or camera registration) refers to a process of determining intrinsic and extrinsic parameters of a camera to associate points in a camera's image space (e.g., the locations in the pixels) with an external 3D world space. The intrinsic parameters generally encompass internal camera parameters such as the focal length, image sensor format, and principal point, as well as lens distortion. The extrinsic parameters denote the 3D position and rotation of the camera with respect to 3D world coordinates, and may be referred to as the "pose" of the camera. These intrinsic and extrinsic parameters are commonly represented in a 3×4 matrix referred to as a camera matrix. A set of cameras may be referred to as being calibrated when the intrinsic and extrinsic parameters of those cameras are known. In particular, a processing circuit can automatically transform images captured by the different cameras to a common coordinate space using the intrinsic and extrinsic parameters of the cameras used to capture those images. This enables the automatic alignment of the pixels of those images. In general, the cameras of a camera array are rigidly fixed together to maintain the accuracy of their calibrated extrinsic parameters with respect to one another. As will be discussed in more detail below, disparity or parallax shifts due to differences in the positions of the cameras within a camera array may be mitigated or minimized based on relatively close spacing between the cameras of the camera array and based on assumptions regarding a minimum distance to objects imaged in a scene.

Some aspects of embodiments of the present disclosure relate to a stereo camera array system including two or more camera arrays, where each of the camera arrays includes a viewpoint-independent camera. Images captured by the viewpoint-independent cameras of the different camera arrays are used to detect correspondences between the different viewpoints of the stereo camera array system. A processing circuit maps the locations of these correspondences within an image captured by the viewpoint-independent camera in a given camera array and the pixels of the images captured by the other cameras of the camera array (that may not be viewpoint-independent) to a same coordinate space based on the known calibration parameters of the cameras in each camera array. This enables embodiments of the present disclosure to leverage viewpoint-independent imaging modality to reliably identify the locations of correspondences in stereo pairs of cameras using viewpoint-dependent imaging modalities, such as polarization imaging.

Camera Array Architectures

FIG. 1 is a schematic block diagram of an imaging system including a stereo camera array system according to embodiments of the present disclosure. In the arrangement shown in FIG. 1, a scene 1 includes transparent objects 2 (e.g., depicted as a ball such as a glass marble, a cylinder such as a drinking glass or tumbler, and a plane such as a pane of transparent acrylic) that are placed in front of opaque matte objects 3 (e.g., a baseball and a tennis ball). A stereo camera array system 10 shown in FIG. 1 two camera arrays 10-1' and 10-2' with corresponding fields of view, where the camera arrays are oriented such that their fields of view overlap and encompass the scene 1.

The stereo camera array system 10 may be configured to capture multiple input images 18 (or raw frames) of the scene 1. In some embodiments, some of the raw frames 18 correspond to images taken behind a polarization filter or polarizer at different angles of linear polarization $\phi_{pol}$ (e.g., 0 degrees, 45 degrees, 90 degrees, or 135 degrees). Each of the raw frames 18 is captured by one of the camera arrays of the stereo camera array system 10 from approximately the same viewpoint with respect to the scene 1 (e.g., the images captured by one camera array 10-1' are captured from a substantially same first pose and first orientation, and the images captured by another camera array 10-2' are captured from a substantially same second pose and second orientation), as opposed to capturing the raw frames from disparate locations and orientations with respect to the scene 1. Some aspects of embodiments relate to correcting for differences in the poses of the cameras within a camera array through image registration based on known calibration parameters of the cameras, where the registration may be performed during sensor fusion, as described in more detail below. The stereo camera array system 10 may be configured to detect light in a variety of different portions of the electromagnetic spectrum, such as the human-visible portion of the electromagnetic spectrum, red, green, and blue portions of the human-visible spectrum, as well as human-invisible portions of the electromagnetic spectrum such as near-infrared, far-infrared, shortwave infrared (SWIR), thermal (longwave infrared or LWIR), ultraviolet, and radio frequency (e.g., using radar imaging).

The raw frames 18 captured by the cameras of the stereo camera array system 10 are supplied to a processing circuit 100, described in more detail below, which computes a processing output 20 based on the raw frames 18. In the embodiment shown in FIG. 1, the processing output 20 is a depth map of the shape of objects 2 and 3 that are present in the scene 1, but embodiments of the present disclosure are not limited thereto. For example, in some embodiments, the processing output 20 may include a segmentation map providing classifications (e.g., the types of objects) of instances of individual objects detected in the scene 1. Specific examples of processing outputs 20 that are computed based on raw frames will be described in more detail below. In the embodiment shown in FIG. 1, the processing circuit 100 is configured to control the stereo camera array system 10.

According to various embodiments of the present disclosure, the processing circuit 100 is implemented using one or more electronic circuits configured to perform various operations as described in more detail below. Types of electronic circuits may include a central processing unit (CPU), a graphics processing unit (GPU), an artificial intelligence (AI) accelerator (e.g., a vector processor, which may include vector arithmetic logic units configured efficiently perform operations common to neural networks, such dot products and softmax), a field programmable gate array (FPGA), an application specific integrated circuit (ASIC), a digital signal processor (DSP), or the like. For example, in some circumstances, aspects of embodiments of the present disclosure are implemented in program instructions that are stored in a non-volatile computer readable memory where, when executed by the electronic circuit (e.g., a CPU, a GPU, an AI accelerator, or combinations thereof), perform the operations described herein to compute a processing output 20, such as an instance segmentation map, from input polarization raw frames 18. The operations performed by the processing circuit 100 may be performed by a single electronic circuit (e.g., a single CPU, a single GPU, or the like) or may be allocated between multiple electronic circuits (e.g., multiple GPUs or a CPU in conjunction with a GPU). The multiple electronic circuits may be local to one another (e.g., located on a same die, located within a same package, located within a same embedded device or computer system, or connected through a local peripheral bus such as Universal Serial Bus (USB)) and/or may be remote from one other (e.g., in communication over a network such as a local personal area network such as Bluetooth®, over a local area network such as a local wired and/or wireless network, and/or over wide area network such as the internet, such a case where some operations are performed locally and other operations are performed on a server hosted by a cloud computing service). One or more electronic circuits operating to implement the processing circuit 100 may be referred to herein as a computer or a computer system, which may include memory storing instructions that, when executed by the one or more electronic circuits, implement the systems and methods described herein.

FIG. 2A is a perspective view of a camera array 10' according to one embodiment of the present disclosure. FIG. 2B is a cross sectional view of a portion of a camera array 10' according to one embodiment of the present disclosure. Some aspects of embodiments of the present disclosure relate to a camera array in which multiple cameras (e.g., cameras having different imaging modalities and/or sensitivity to different spectra) are arranged adjacent to one another and in an array and may be controlled to capture images in a group (e.g., a single trigger may be used to control all of the cameras in the system to capture images concurrently or substantially simultaneously). In some embodiments, the individual cameras are arranged such that parallax shift between cameras is substantially negligible based on the designed operating distance of the camera system to objects 2 and 3 in the scene 1, where larger spacings between the cameras may be tolerated when the designed operating distance is large.

FIG. 2B shows a cross sectional view of two of the cameras 10A' and 10B' of the camera array 10' shown in FIG. 2A. As seen in FIG. 2B, each camera (10A' and 10B') includes a corresponding lens, a corresponding image sensor, and may include one or more corresponding filters. For example, in some embodiments, camera 10A' is a visible light color camera that includes lens 12A', image sensor 14A', and color filter 16A' (e.g., a Bayer filter). In the embodiment shown in FIG. 2B, the filter 16 is located behind the lens 12 (e.g., between the lens 12 and the image sensor 14), but embodiments of the present disclosure are not limited thereto. In some embodiments, the filter 16 is located in front of the lens 12, and in some embodiments, the filter 16 may include multiple separate components, where some components are located in front of the lens and other components are located behind the lens (e.g., a polarizing filter in front of the lens 12 and a color filter behind the lens 12). In some embodiments, camera 10B' is a polarization camera that includes lens 12B', image sensor 14B', and polarizing filter 16B' (a polarization camera may also include a visible light color filter or other filter for passing a particular portion of the electromagnetic spectrum, such as an infrared filter, ultraviolet filter, and the like). In some embodiments of the present disclosure, the image sensors four cameras 10A', 10B', 10C', and 10D' are monolithically formed on a same semiconductor die, and the four cameras are located in a same housing with separate apertures for the lenses 12 corresponding to the different image sensors. Similarly, the filters 16 may correspond to different portions of a single physical layer that has different optical filter functions (e.g., different linear polarizing angles or circular polarizers, color filters with corresponding spectral response functions, and the like) in different regions of the layer (corresponding to the different cameras). In some embodiments, a filter 16 of a polarization camera includes a polarization mask 16 similar to the Sony® IMX250MZR sensor, which includes a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, a camera of the camera array 10' may use a polarization mask 16 to concurrently or simultaneously capture light at four different linear polarizations.

In some embodiments, a demosaicing process is used to compute separate red, green, and blue channels from the raw data. In some embodiments of the present disclosure, each polarization camera may be used without a color filter or with filters used to transmit or selectively transmit various other portions of the electromagnetic spectrum, such as infrared light.

As noted above, embodiments of the present disclosure relate to multi-modal and/or multi-spectral camera arrays. Accordingly, in various embodiments of the present disclosure, the cameras within a particular camera array include cameras configured to perform imaging in a plurality of different modalities and/or to capture information in a plurality of different spectra.

As one example, in some embodiments, the first camera 10A' is a visible light camera that is configured to capture color images in a visible portion of the electromagnetic spectrum, such as by including a Bayer color filter 16A' (and, in some cases, a filter to block infrared light), and the second camera 10B', third camera 10C', and fourth camera 10D' are polarization cameras having different polarization filters, such filters having linear polarization angles of 0°, 60°, and 120°, respectively. The polarizing filters in the optical paths of each of the cameras in the array cause differently polarized light to reach the image sensors of the cameras. The individual polarization cameras in the camera array have optical axes that are substantially perpendicular to one another, are placed adjacent to one another, and have substantially the same field of view, such that the cameras in the camera array capture substantially the same view of a scene as the visible light camera 10A', but with different polarizations. While the embodiment shown in FIG. 2A includes a 2×2 array of four cameras, three of which are polarization cameras, embodiments of the present disclosure are not limited thereto, and the camera array may more than three polarization cameras, each having a polarizing filter with a different polarization state (e.g., a camera array may have four polarization cameras along with the visible light color camera 10A', where the polarization cameras may have polarization filters with angles of linear polarization, such as 0°, 45°, 90°, and 135°). In some embodiments, one or more of the cameras may include a circular polarizer.

As another example, one or more of the cameras in the camera array 10' may operate in other imaging modalities and/or other imaging spectra, such as polarization, near infrared, far infrared, shortwave infrared (SWIR), longwave infrared (LWIR) or thermal, ultraviolet, and the like, by including appropriate filters 16 (e.g., filters that pass light having particular polarizations, near-infrared light, SWIR light, LWIR light, ultraviolet light, and the like) and/or image sensors 14 (e.g., image sensors optimized for particular wavelengths of electromagnetic radiation) for the particular modality and/or portion of the electromagnetic spectrum.

For example, in the embodiment of the camera array 10' shown in FIG. 2A, four cameras 10A', 10B', 10C', and 10D' are arranged in a 2×2 grid to form a camera array, referred to herein as a camera array, where the four cameras have substantially parallel optical axes. The four cameras may be controlled together such that they capture images substantially simultaneously. In some embodiments, the four cameras are configured to capture images using the same exposure settings (e.g., same aperture, length of exposure, and gain or "ISO" settings). In some embodiments, the exposure settings for the different cameras can be controlled independently from one another (e.g., different settings for each camera), where the processing circuit 100 jointly or holistically sets the exposure settings for the cameras based on the current conditions of the scene 1 and the characteristics of the imaging modalities and spectral responses of the cameras 10A', 10B', 10C', and 10D' of the camera array 10', as will be described in more detail below.

In some embodiments, the various individual cameras of the camera array are registered with one another by determining their relative poses (or relative positions and orientations) by capturing multiple images of a calibration target, such as a checkerboard pattern, an ArUco target (see, e.g., Garrido-Jurado, Sergio, et al. "Automatic generation and detection of highly reliable fiducial markers under occlusion." *Pattern Recognition* 47.6 (2014): 2280-2292) or a ChArUco target (see, e.g., An, Gwon Hwan, et al. "Charuco board-based omnidirectional camera calibration method." *Electronics* 7.12 (2018): 421). In particular, the process of calibrating the targets may include computing intrinsic matrices characterizing the internal parameters of each camera (e.g., matrices characterizing the focal length, image sensor format, and principal point of the camera) and extrinsic matrices characterizing the pose of each camera with respect to world coordinates (e.g., matrices for performing transformations between camera coordinate space and world or scene coordinate space). Different cameras within a camera array may have image sensors with different sensor formats (e.g., aspect ratios) and/or different resolutions without limitation, and the computed intrinsic and extrinsic parameters of the individual cameras enable the processing circuit 100 to map different portions of the different images to a same coordinate space (where possible, such as where the fields of view overlap).

Figure 2C:
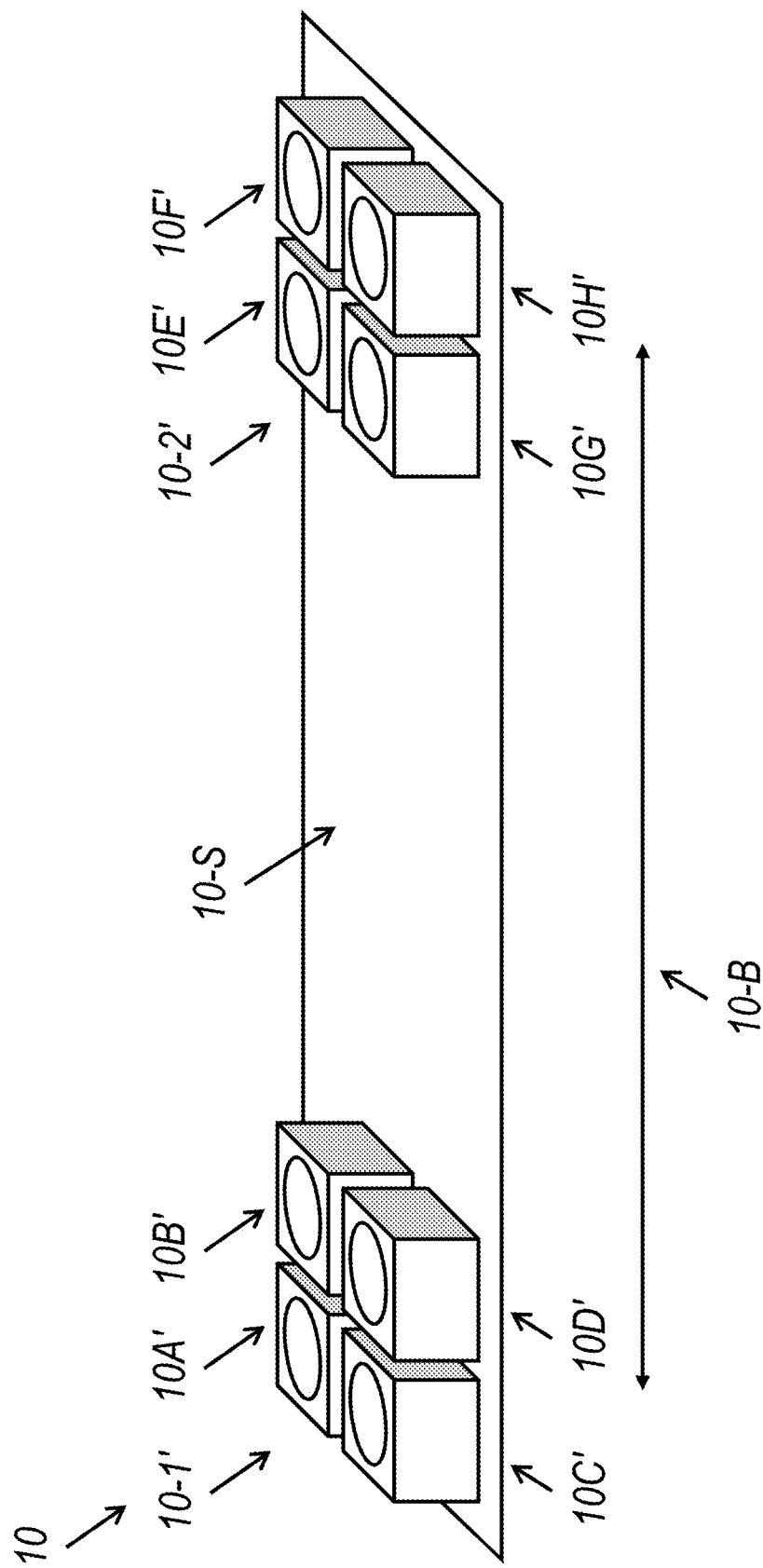
FIG. 2C is a perspective view of a stereo camera array system according to one embodiment of the present disclosure.
Figure 2D:
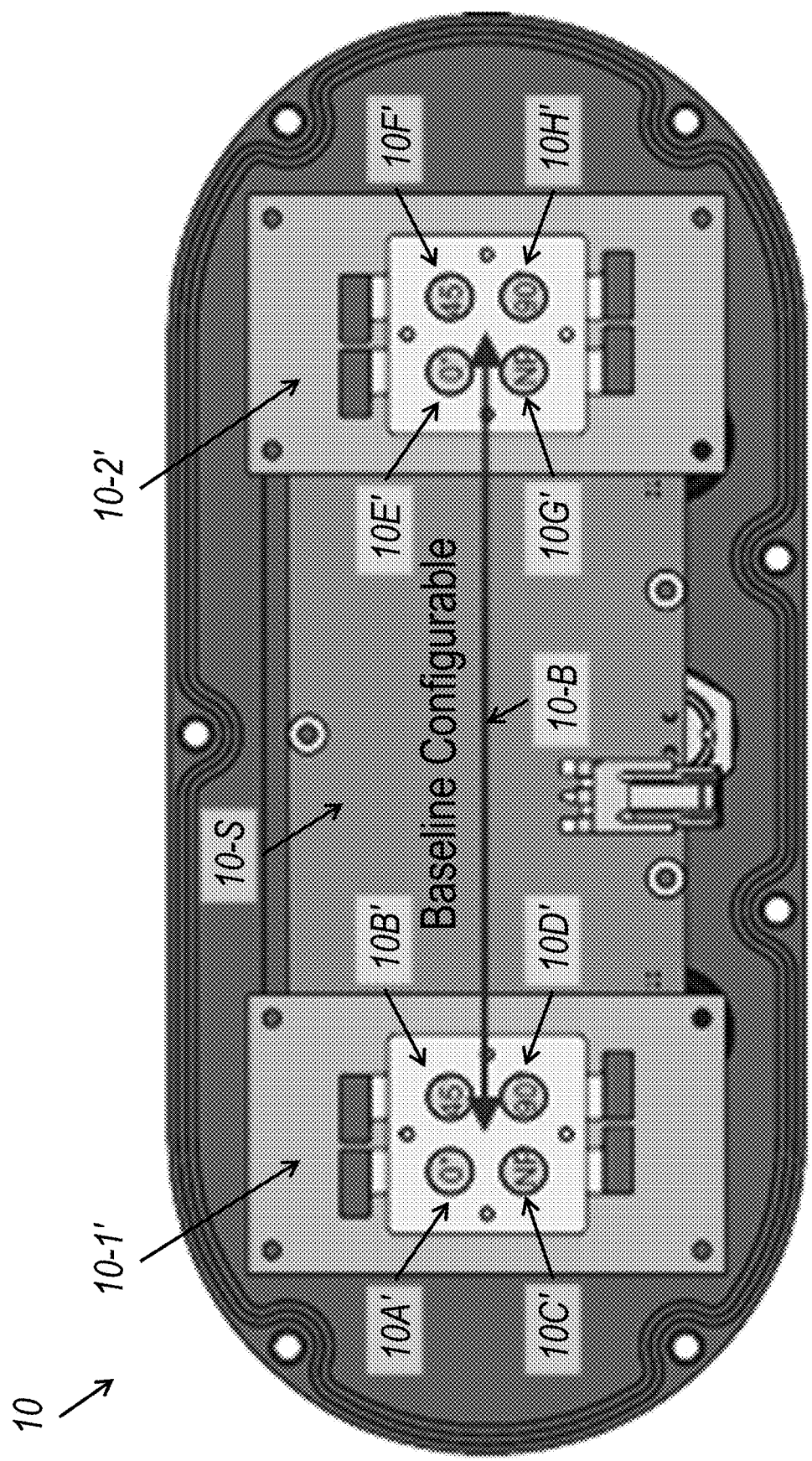
FIG. 2D is a plan view of a stereo camera array system according to one embodiment of the present disclosure.

FIG. 2C is a perspective view of a stereo camera array system 10 according to one embodiment of the present disclosure. FIG. 2D is a plan view of a stereo camera array system 10 according to one embodiment of the present disclosure. For some applications, stereo vision techniques are used to capture multiple images of scene from different perspectives. As noted above, in some embodiments of the present disclosure, individual cameras (or camera modules) within a camera array 10' are placed adjacent to one another such that parallax shifts between the cameras are small or substantially negligible based on the designed operating distance of the camera system to the subjects being imaged (e.g., where the parallax shifts between cameras of a same array are less than a pixel for objects at the operating distance). In addition, as noted above, in some embodiments, differences in the poses of the individual cameras within a camera array 10' are corrected through image registration based on the calibrations (e.g., computed intrinsic and extrinsic parameters) of the cameras such that the images are aligned to a same coordinate system for the viewpoint of the camera array.

In stereo camera array systems according to some embodiments, the camera arrays are spaced apart from one another such that parallax shifts between the viewpoints corresponding to the camera arrays are detectable for objects in the designed operating distance of the camera system. This enables the distances to various surfaces in a scene (the "depth") to be detected in accordance with a disparity measure or a magnitude of a parallax shift (e.g., larger parallax shifts in the locations of corresponding portions of the images indicate that those corresponding portions are on surfaces that are closer to the camera system and smaller parallax shifts indicate that the corresponding portions are on surfaces that are farther away from the camera system). These techniques for computing depth based on parallax shifts are sometimes referred to as Depth from Stereo Accordingly, FIG. 2C and FIG. 2D depict a stereo camera array system 10 having a first camera array 10-1' and a second camera array 10-2' having substantially parallel optical axes and spaced apart along a baseline 10-B. In the embodiments shown in FIG. 2C and FIG. 2D, the first camera array 10-1' includes cameras 10A', 10B', 10C', and 10D' arranged in a 2×2 array similar to that shown in FIG. 2A and FIG. 2B. Likewise, the second camera array 10-2' includes cameras 10E', 10F', 10G', and 10H' arranged in a 2×2 array, and the overall stereo camera array system 10 includes eight individual cameras (e.g., eight separate image sensors behind eight separate lenses). In some embodiments of the present disclosure, corresponding cameras of the camera arrays 10-1' and 10-2' are of the same type or, in other words, configured to capture raw frames or images using substantially the same imaging modalities or in substantially the same spectra. In the specific embodiment shown in FIG. 2C, cameras 10A' and 10E' may be of a same first type, cameras 10B' and 10F' may be of a same second type, cameras 10C' and 10G' may be of a same third type, and cameras 10D' and 10H' may be of a same fourth type. For example, in the embodiment shown in FIG. 2D, cameras 10A' and 10E' may both have linear polarizing filters at a same angle of 0°, cameras 10B' and 10F' may both have linear polarizing filters at a same angle of 45°, cameras 10C' and 10G' may both be viewpoint-independent cameras having no polarization filter (NF), such as near-infrared cameras, and cameras 10D' and 10H' may both have linear polarizing filters at a same angle of 90°. As another example, cameras 10A' and 10E' may both be viewpoint-independent cameras such as visible light cameras without polarization filters, cameras 10B' and 10F' may both be thermal cameras, cameras 10C' and 10G' may both have polarization masks with a mosaic pattern polarization filters at different angles of polarization (e.g., a repeating pattern with polarization angles of 0°, 45°, 90°, and 135°), and cameras 10D' and 10H' may both be thermal (LWIR) cameras.

While some embodiments are described above wherein each array includes cameras of different types in a same arrangement, embodiments of the present disclosure are not limited thereto. For example, in some embodiments, the arrangements of cameras within a camera array are mirrored along an axis perpendicular to the baseline 10-B. For example, cameras 10A' and 10F' may be of a same first type, cameras 10B' and 10E' may be of a same second type, cameras 10C' and 10H' may be of a same third type, and cameras 10D' and 10G' may be of a same fourth type.

In a manner similar to that described for calibrating or registering cameras within a camera array, the various polarization camera arrays of a stereo camera array system may also be registered with one another by capturing multiple images of calibration targets and computing intrinsic and extrinsic parameters for the various camera arrays. The camera arrays of a stereo camera array system 10 may be rigidly attached to a common rigid support structure 10-S in order to keep their relative poses substantially fixed (e.g., to reduce the need for recalibration to recompute their extrinsic parameters). As indicated in FIG. 2D, the baseline 10-B between camera arrays is configurable in the sense that the distance between the camera arrays may be tailored based on a desired or expected operating distance to objects in a scene—when the operating distance is large, the baseline 10-B or spacing between the camera arrays may be longer, whereas the baseline 10-B or spacing between the camera arrays may be shorter (thereby allowing a more compact stereo camera array system) when the operating distance is smaller.

While embodiments of stereo camera array systems shown in FIGS. 1, 2A, 2B, 2C, and 2D include two polarization camera arrays spaced along a baseline, and where each camera array includes four cameras, embodiments of the present disclosure are not limited thereto.

Figure 3B:
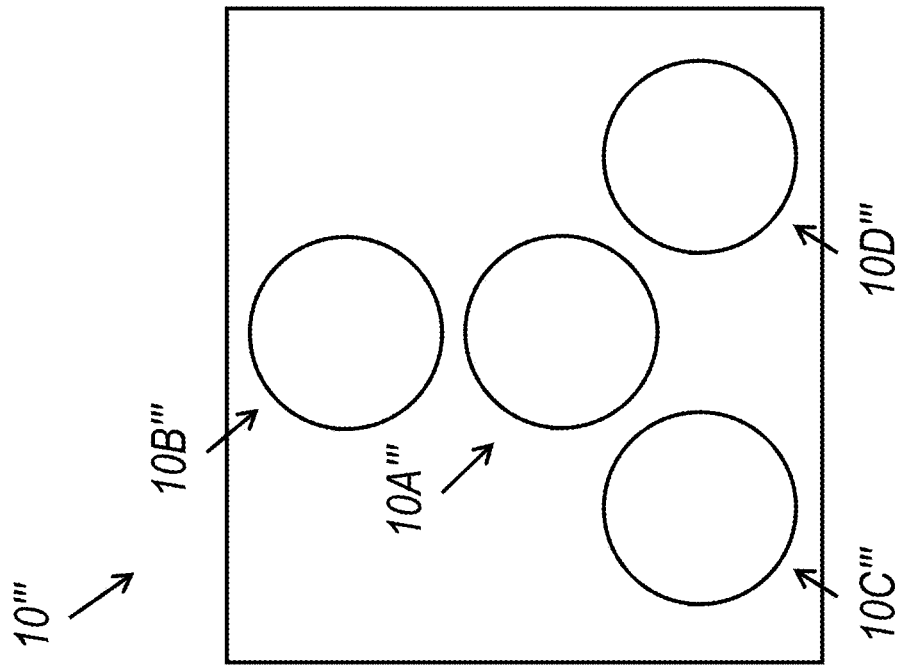
FIGS. 3A, 3B, 3C, and 3D schematically depict examples of arrangements of cameras in camera arrays according to various embodiments of the present disclosure.
Figure 3A:
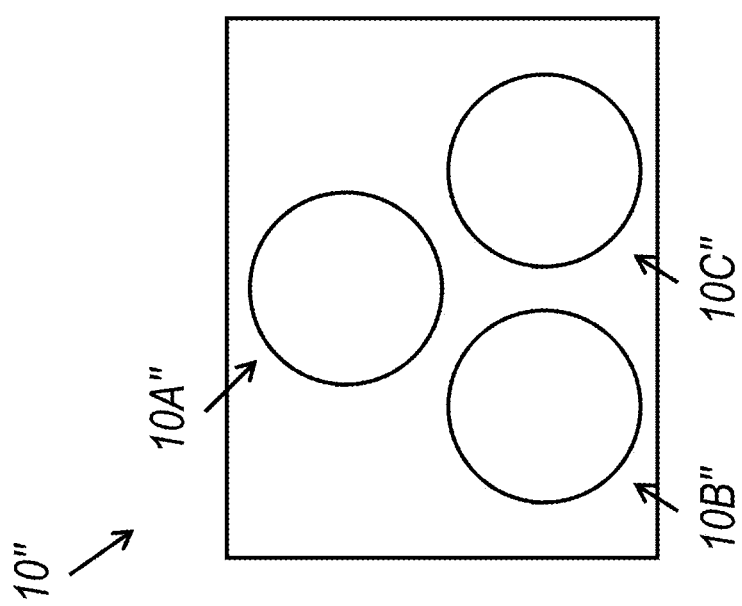
Figure 3D:
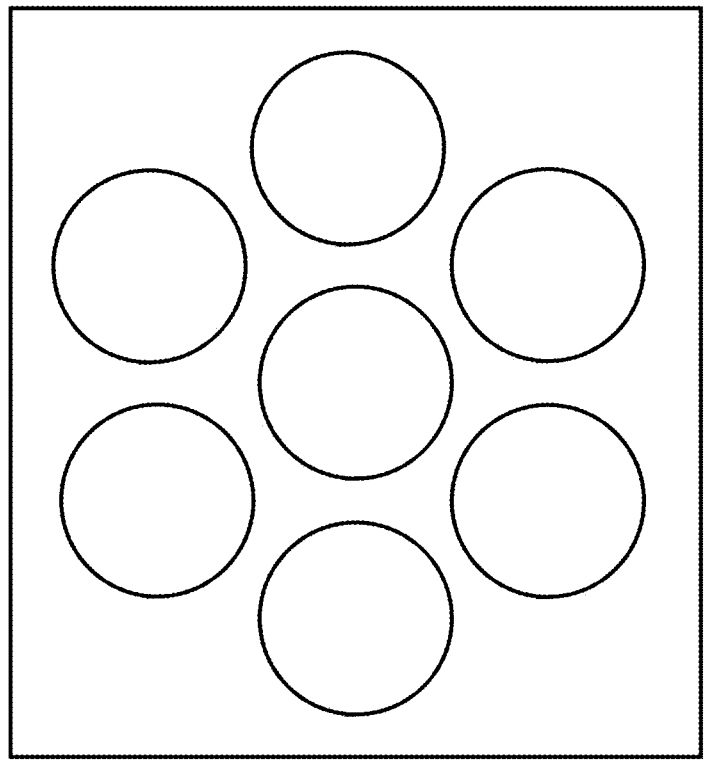
Figure 3C:
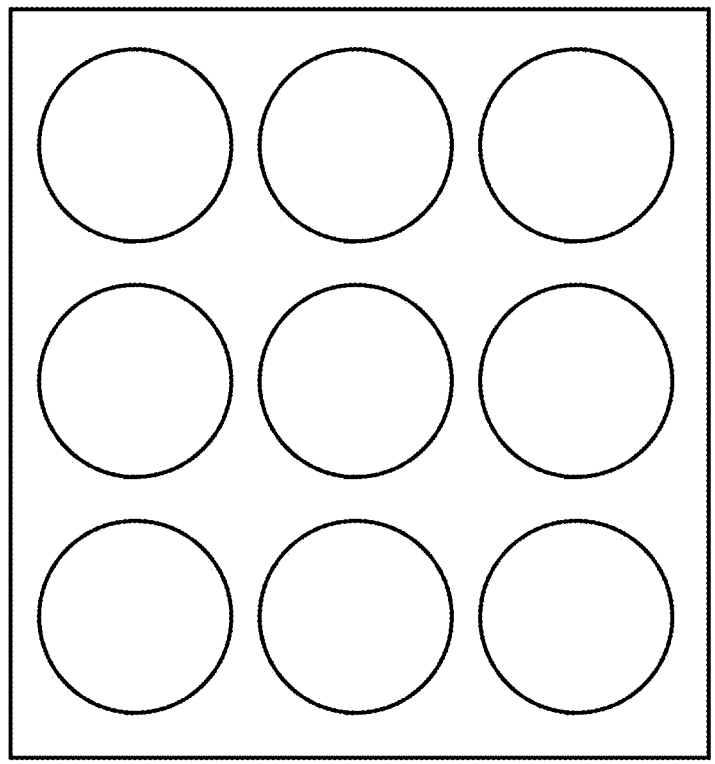

FIGS. 3A, 3B, 3C, and 3D schematically depict examples of arrangements of cameras in camera arrays according to various embodiments of the present disclosure. FIG. 3A depicts a camera array 10" including three cameras 10A", 10B", and 10C" arranged in a triangle. FIG. 3B depicts a camera array 10''' including four cameras 10A''', 10B''', 10C''', and 10D''' arranged in a star shape with camera 10A''' in the center and cameras 10B''', 10C''', and 10D''' spaced around central camera 10A'''. FIG. 3C depicts a camera array 10'''' with cameras arranged in a 3×3 grid. FIG. 3D depicts a camera array 10''''' with seven cameras arranged in a star shape where six cameras arranged around a central camera.

In embodiments where a camera array includes five or more cameras, one of the cameras may be a viewpoint-independent camera and four of the cameras may be polarization cameras having linear polarizing filters at four different angles of linear polarization. In some embodiments, the four different angles of linear polarization are spaced 45° apart, such as at 0°, 45°, 90°, and 135°.

In some embodiments where the cameras of the camera array are arranged around a central camera (e.g., FIGS. 3B, 3C, and 3D), the central camera is a camera that uses a viewpoint-independent imaging modality, thereby reducing a magnitude of a transformation between the viewpoint-independent camera (e.g., a visible light camera without a polarization filter) and the other cameras of the camera array that may operate in other modalities or spectra.

While FIGS. 3A, 3B, 3C, and 3D depict some additional possible arrangements of cameras in a camera array, embodiments of the present disclosure are not limited thereto, and cameras within a camera array may have different arrangements, including asymmetrical arrangements of cameras.

Figure 4A:
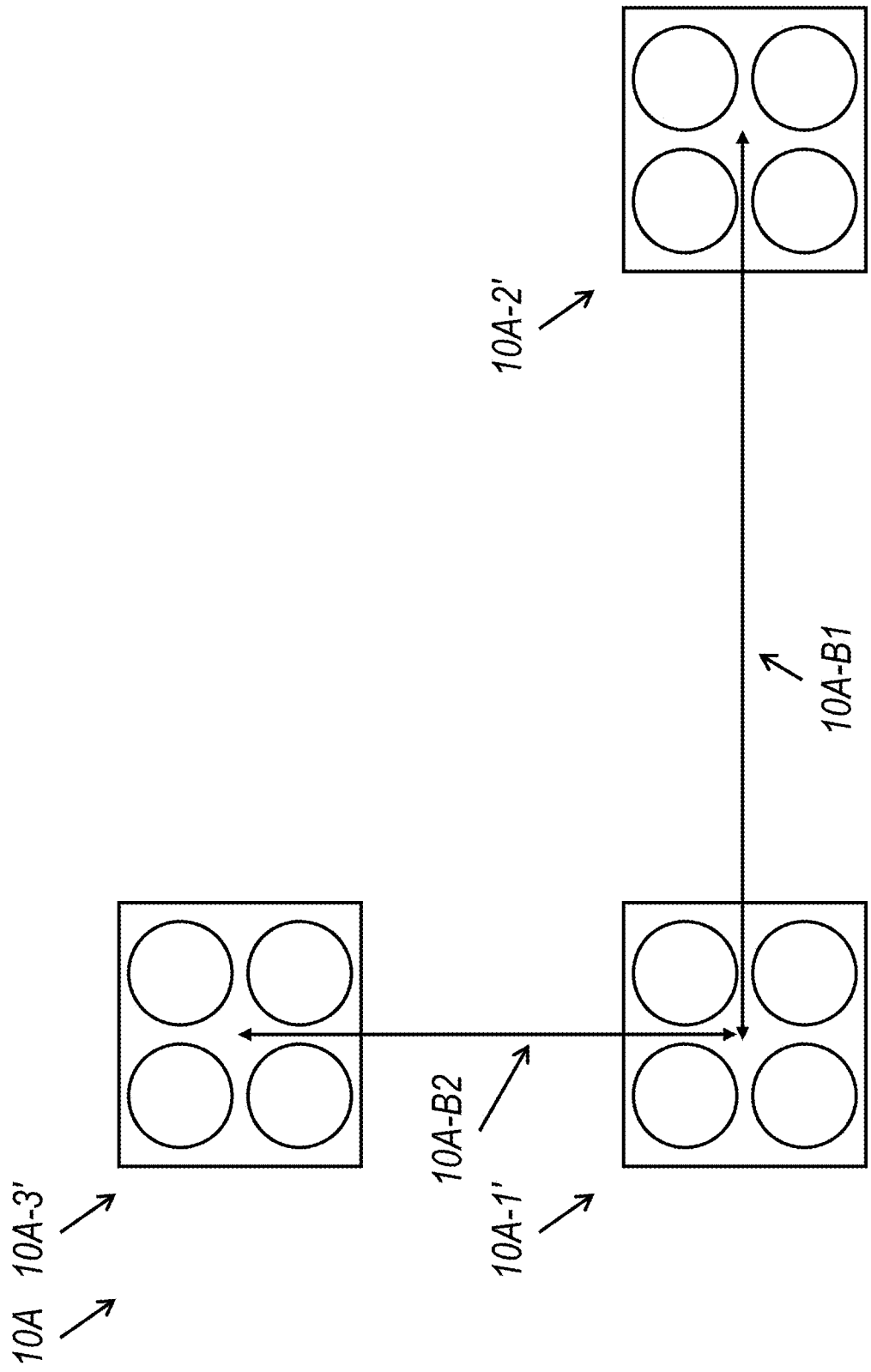
FIG. 4A depicts a stereo camera array system including three camera arrays according to one embodiment of the present disclosure.
Figure 4B:
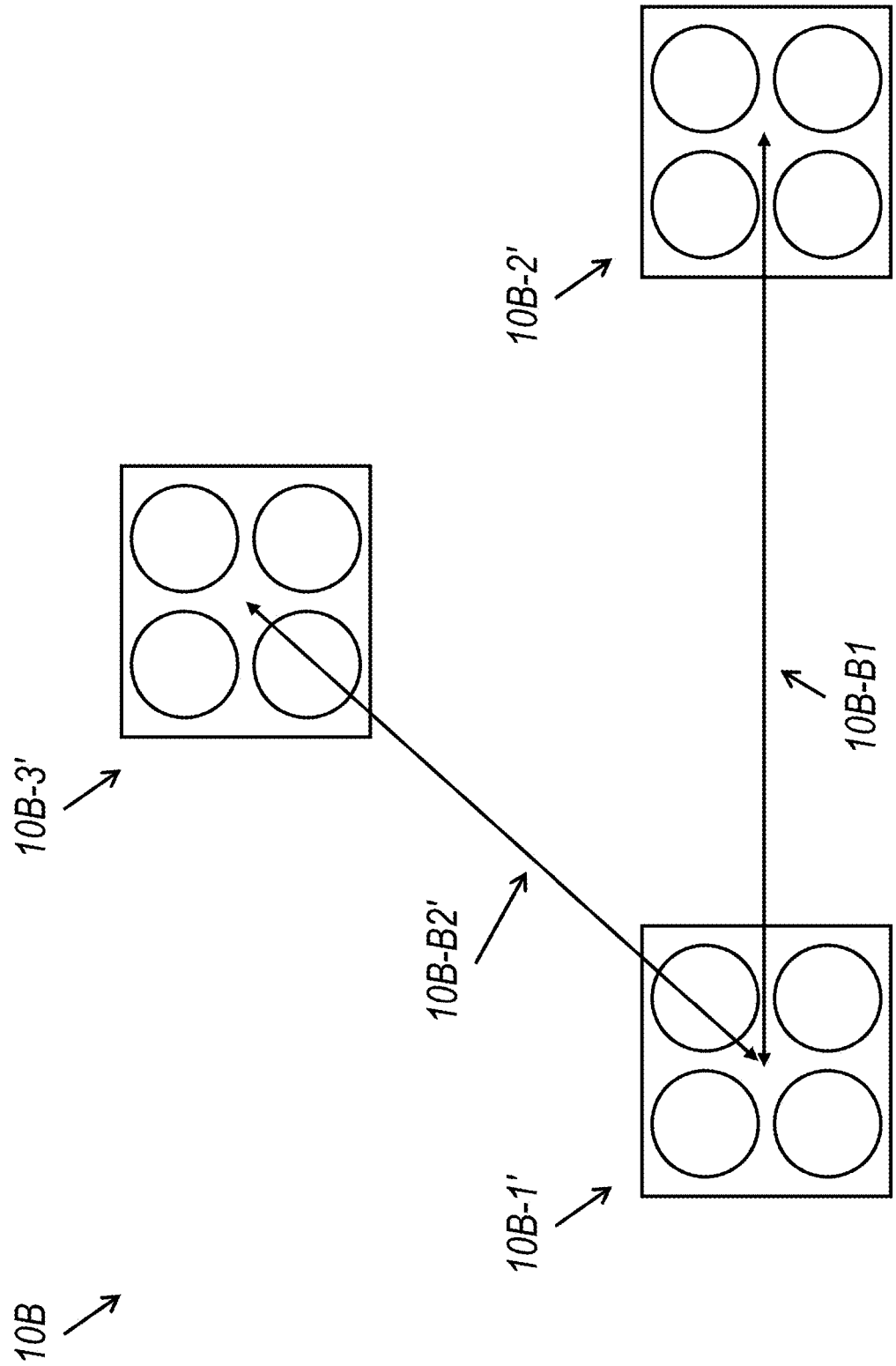
FIG. 4B depicts a stereo camera array system including three camera arrays according to one embodiment of the present disclosure.
Figure 4C:
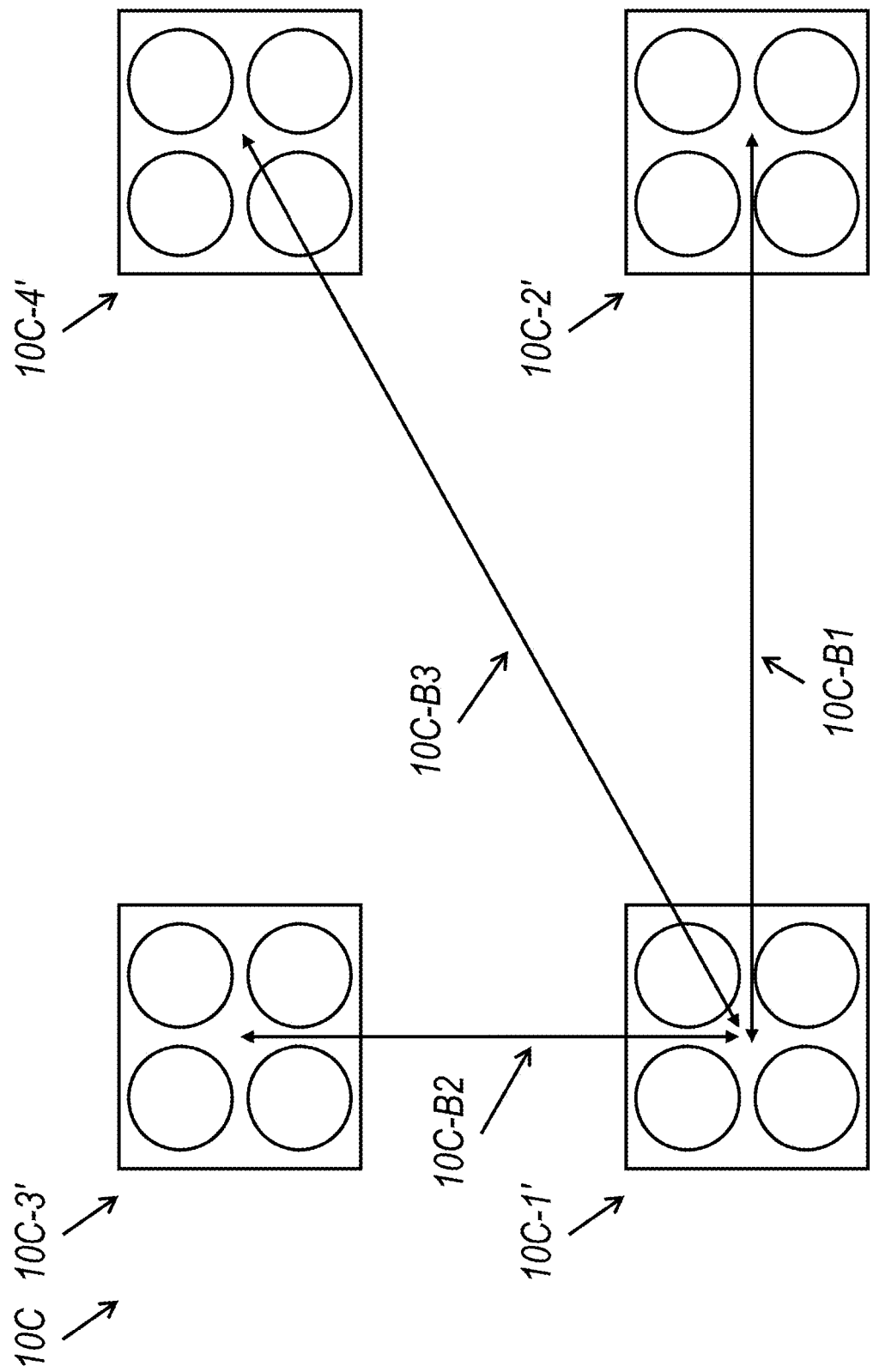
FIG. 4C depicts a stereo camera array system including four camera arrays according to one embodiment of the present disclosure.

While FIGS. 1, 2C, and 2D depict stereo camera array systems that include two camera arrays, embodiments of the present disclosure are not limited thereto, and may include more than two camera arrays. FIGS. 4A, 4B, and 4C show examples of stereo camera array systems that include more than two camera arrays. For the sake of convenience, the camera arrays shown in FIGS. 4A, 4B, and 4C include cameras arranged in 2×2 grids, but embodiments of the present disclosure are not limited thereto, and the camera arrays may have other arrangements of cameras, such as those shown in FIGS. 3A, 3B, 3C, and 3D. In addition, different camera arrays of a stereo camera array system may have different arrangements of cameras. For example, a stereo camera array system may include a first camera array with cameras arranged in a 2×2 grid, a second camera array with six cameras arranged around a central seventh camera, and a third camera array with three cameras arranged around a central fourth camera.

FIG. 4A depicts a stereo camera array system 10A including three camera arrays 10A-1', 10A-2', and 10A-3' according to one embodiment of the present disclosure. The first camera array 10A-1' and second camera array 10A-2' of the stereo camera array system 10A of FIG. 4A are spaced apart along a first baseline 10A-B1. The first camera array 10A-1' and third camera array 10A-3' of the stereo camera array system 10A of FIG. 4A are spaced apart along a different, second baseline 10A-B2, where the second baseline 10A-B2 is shown as being perpendicular to the first baseline 10A-B1, and where the first baseline 10A-B1 and second baseline 10A-B2 have different lengths, although embodiments are not limited thereto, and the first baseline 10A-B1 and the second baseline 10A-B2 may have the same length.

FIG. 4B depicts a stereo camera array system 10B including three camera arrays 10B-1', 10B-2', and 10B-3' according to one embodiment of the present disclosure. The first camera array 10B-1' and second camera array 10B-2' of the stereo camera array system 10B are spaced apart along a first baseline 10B-B1. The first camera array 10B-1' and third camera array 10B-3' of the stereo camera array system 10B are spaced apart along a different, second baseline 10B-B2, where the second baseline 10B-B2 is shown as forming an acute angle with respect to the first baseline 10B-B1.

FIG. 4C depicts a stereo camera array system 10C including four camera arrays 10C-1', 10C-2', 10C-3', and 10C-4' according to one embodiment of the present disclosure. The first camera array 10C-1' is spaced from the second camera array 10C-2' along a first baseline 10C-B1, the first camera array 10C-1' is spaced from the third camera array 10C-3' along a second baseline 10C-B2, and the first camera array 10C-1' is spaced from the fourth camera array 10C-2' along a third baseline 10C-B3, such that the four camera arrays are arranged in a rectangle, although embodiments of the present disclosure are not limited thereto.

Accordingly, embodiments of the present disclosure include various arrangements of multi-modal and/or multi-spectral camera arrays, where the camera arrays are arranged into stereo camera array systems.

Joint Control of Capture Parameters

As discussed above, in some embodiments, the processing circuit 100 is configured to control the stereo camera array system 10. This control of the stereo camera array system 10 includes setting the capture parameters of the cameras of the camera array and triggering the cameras of the array to capture images. Examples of capture parameters include exposure parameters in the case of optical cameras (e.g., aperture, exposure time, and gain or ISO), controlling, if present, any light projection systems such as structured light projectors or flashes, scanning speeds or scanning modes in the case of radar or lidar, and the like.

Based on an evaluation of the scene being imaged, a processing circuit 100 independently controls the capture parameters of each of the multi-modal cameras of the camera array based on an evaluation metric that combines information (e.g., previously captured images) from multiple cameras of the camera array (e.g., all of the cameras of the camera array). This provides holistic control of the capture parameters across all of the cameras of the array, in contrast to optimizing the capture parameters for each individual camera based on that camera's own view of the scene. This joint evaluation with independent control enables embodiments of the present disclosure to obtain good overall exposures (e.g., avoiding overexposed or underexposed images) when imaging scenes having very different levels of light intensity in different spectra. For example, a brightly lit environment (in terms of visible light) may also have relatively little thermal radiation (LWIR), and therefore the processing circuit 100 may tailor the exposure parameters of the visible light cameras to reduce their exposures (e.g., have short exposure times) while controlling the thermal cameras to increase their exposures (e.g., have exposure times different from and longer than the visible light cameras). Generally, in embodiments of the present disclosure, corresponding cameras of the same modality in different camera arrays (e.g., a visible light camera in a left camera array and a visible light camera in a right camera array) are configured with the same capture settings in order to increase similarity of the appearance of corresponding portions of the scene across the different viewpoints corresponding to different arrays. In some embodiments, cameras of different modalities (e.g., a visible light camera and a near-infrared camera) are controlled independently to have different capture parameters (e.g., different ISO or gain parameters, and different shutter speeds or frame rates), and may have some interdependence (e.g., an overall frame rate of the stereo camera array system sets an upper limit on the exposure time used in the capture parameters for any given modality).

In some embodiments, the processing circuit 100 sets the capture parameters based on prior images captured by the stereo camera array system.

Correspondence Detection for
Viewpoint-Dependent Imaging Modalities Based on
Viewpoint-Independent Imaging Modalities Some aspects of embodiments of the present disclosure relate to processing images captured by the stereo camera array system. Images processed based on these aspects of embodiments may be used as inputs to computer vision processing systems, such as for generating refined 3D reconstructions of a scene, performing classification or instance segmentation, detecting the 6 degree-of-freedom poses of objects detected in a scene, and the like. Such computer vision systems using inputs from multi-modal stereo camera array systems according to embodiments of the present disclosure may be used to support, for example, robotics (e.g., manufacturing robotics and personal robotics), self-driving vehicles, and the like.

Figure 5:
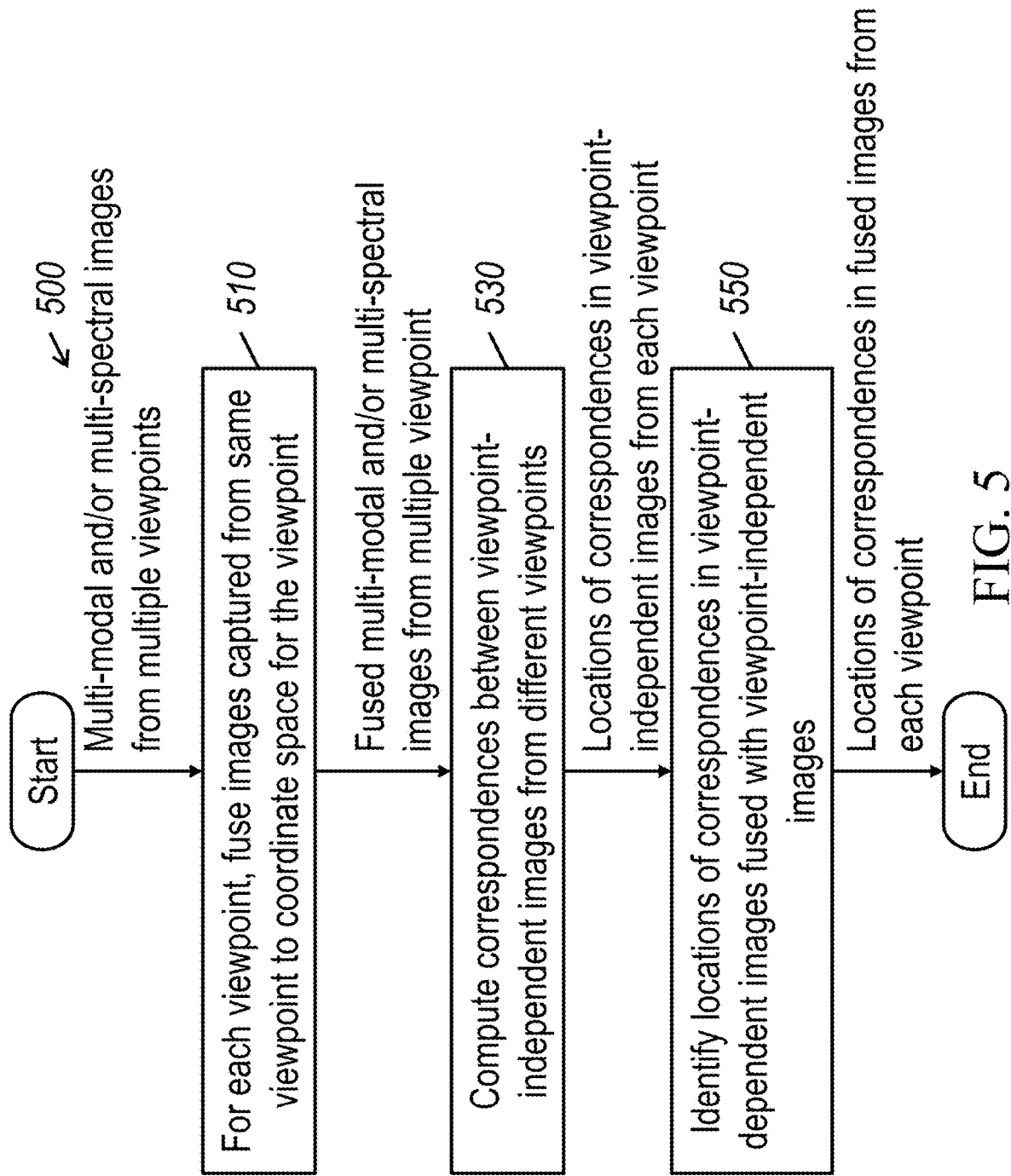
FIG. 5 is a flowchart depicting a method for detecting correspondences between fused multi-modal and/or multi-spectral images captured by different camera arrays according to embodiments of the present disclosure.

FIG. 5 is a flowchart depicting a method 500 for detecting correspondences between fused multi-modal and/or multi-spectral images captured by different camera arrays according to embodiments of the present disclosure. As mentioned above, attempting to detect correspondences between stereo pairs of images captured using imaging modalities that do not comply with the brightness constancy assumption (viewpoint-dependent imaging modalities) results in high error rates and/or high noise in the generated output (e.g., noisy depth maps). As such, FIG. 5 relates to one method for identifying the locations of correspondences in images captured using viewpoint-dependent imaging modalities through the support of images captured in one or more viewpoint-independent imaging modalities.

For the sake of discussion, FIG. 5 will be described herein as being performed by the processing circuit 100, which may include one or more physical electronic circuits (e.g., processors) that may be local to one another (e.g., within one die or within a same enclosure or connected over a local peripheral bus) or which may be remote from one another or distributed (e.g., in communication over a network) or combinations thereof. Therefore, when describing operations as being performed by "a processing circuit," embodiments of the present disclosure include embodiments where all operations are performed within a single physical electronic circuit as well as embodiments where the operations are distributed among multiple electronic circuits that are local to one another, remote from one another, and combinations thereof (e.g., some electronic circuits that are local, in communication with some electronic circuits that are remote).

As shown in FIG. 5, multi-modal and/or multi-spectral images captured from multiple viewpoints are provided as input. These multi-modal and/or multi-spectral images may be captured concurrently (e.g., substantially simultaneously) by the cameras of the multiple camera arrays of a stereo camera array system, where each of the camera arrays is at a different viewpoint with respect to a scene (or has a different viewpoint of the scene). The images are multi-modal and/or multi-spectral in the sense that different cameras of a given camera array capture images in different imaging modalities and/or in different spectra.

For the sake of concision, unless specified otherwise, the term "modality" may be used herein to refer to imaging modalities (e.g., polarized versus non-polarized or without a polarization filter, or cameras that are outside the visible range of electromagnetic radiation such as Near-IR, SWIR, LWIR) as well as imaging spectra (e.g., visible, infrared, thermal, ultraviolet, etc.). and therefore images captured in a "first modality" and a "second modality different from the first modality" may refer to circumstances where, for example, the first modality is near-infrared without a polarizing filter and the second modality is near-infrared light with a polarizing filter (different modalities of not-polarization versus polarization, same spectra of near-infrared) as well as circumstances where the first modality is near-infrared without a polarizing filter and the second modality is thermal (LWIR) without a polarizing filter (same modalities of not-polarization, different spectra of near-infrared and LWIR).

The multi-modal and/or multi-spectral images (multi-modal images, for short) are captured from multiple different viewpoints corresponding to the different camera arrays.

In operation 510, for each viewpoint, the processing circuit 100 fuses the images captured from that viewpoint. For example, for each camera array, the processing circuit 100 fuses the images captured by the different cameras of that camera array (e.g., an image captured by a near-infrared camera without polarization of the camera array and three polarization images captured at three different angles of linear polarization, captured by three different polarization cameras of the same camera array). The fusion of images may include the registration of images captured by the different cameras of a camera array, as described in more detail below.

Figure 6:
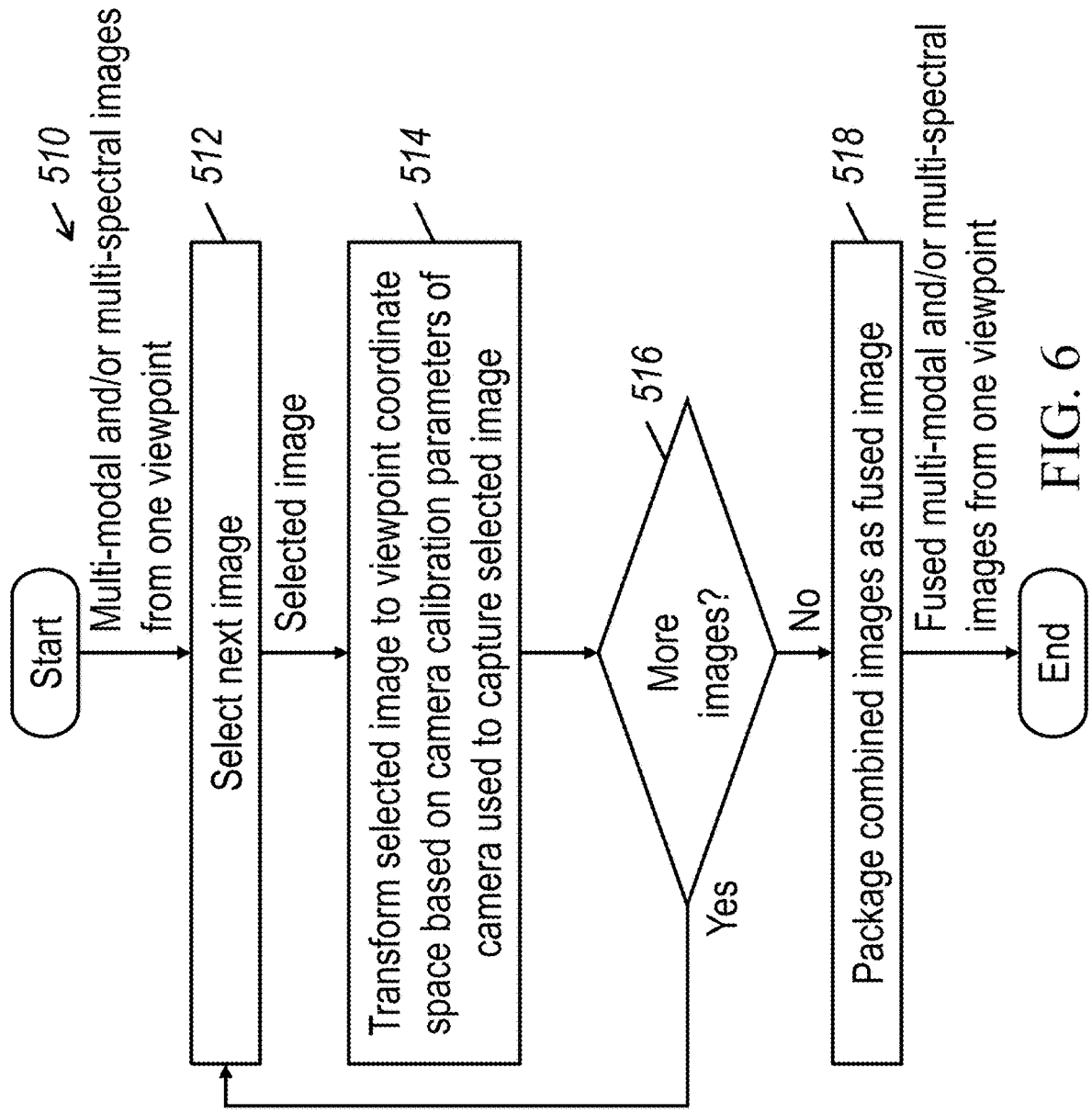
FIG. 6 is a flowchart depicting a method for performing fusion of multi-modal and/or multi-spectral images captured by a camera array according to one embodiment of the present disclosure.

FIG. 6 is a flowchart depicting a method 510 for performing fusion of multi-modal and/or multi-spectral images captured by a camera array according to one embodiment of the present disclosure. In the method shown in FIG. 6, the multi-modal images from one viewpoint (e.g., from the cameras of the same camera array) are supplied as input. In operation 512, a next image from among the multi-modal images to be processed is selected. In operation 514, the processing circuit 100 transforms (or registers) the selected image to a coordinate space corresponding to the viewpoint (a "viewpoint coordinate space"). In some embodiments, a viewpoint coordinate space corresponds to the pose of a designated "main camera," "primary camera," or particular camera of the camera array (e.g., a central camera in the case of camera array arrangements having cameras arranged around a central camera). In some embodiments, the viewpoint coordinate space corresponds to the location of a fictitious or virtual camera (e.g., not corresponding to any physical camera of the camera array). Accordingly, in some embodiments, camera calibration parameters (e.g. extrinsic parameters and, in some embodiments, intrinsic parameters) associated with the camera that was used to capture that image are used to perform the transformation of the selected image to the viewpoint coordinate space. In operation 516, the processing circuit 100 determines if there are more images to be transformed to the viewpoint coordinate space. If so, then the processing circuit 100 proceeds to select the next image in operation 512. If there are no additional images to be processed, then the processing circuit 100 packages the transformed multi-modal images as a fused image. In some embodiments, the processing circuit 100 performs transformations of multiple images concurrently and/or in parallel.

Referring back to FIG. 5, in operation 530, the processing circuit 100 computes correspondences between viewpoint-independent images captured from the different viewpoints. As a concrete example, each camera array includes a camera configured to capture images in a viewpoint-independent imaging modality (e.g., visible light without a polarizing filter or near-infrared light without a polarizing filter). In various embodiments, the processing circuit 100 applies one or more correspondence detection technique such as block matching, dense feature descriptors, deep learning descriptors, and the like, where the search for correspondences between images is typically performed along epipolar lines (e.g., lines parallel to the baseline between pairs of camera arrays containing the viewpoint-independent cameras). In some embodiments, each of the detected correspondences is represented by pixel coordinates within each of the viewpoint coordinate spaces. For example, a pixel $(x_1, y_1)$ in a viewpoint-independent image captured from a first viewpoint may be determined to correspond to a pixel $(x_2, y_2)$ in a viewpoint-independent image captured from a second viewpoint.

In some embodiments, the order of performing operation 510 and 530 may be reversed, with operation 530 being performed before operation 510. In some embodiments, operations 510 and 530 are performed concurrently and/or in parallel.

In operation 550, the locations of the correspondences, as detected in the viewpoint-independent images, are used to identify the locations of correspondences within the images captured using other imaging modalities, which may include viewpoint-dependent modalities (e.g., polarization images or images captured through a polarization filter). For example, in the case described herein where the images captured in different modalities are registered or transformed to a same viewpoint coordinate space, pixel locations in the different images of the fused image correspond to the same surfaces in the scene. As such, the pixel locations of the correspondences computed in operation 530 are also pixel locations of the same surfaces as depicted in the other imaging modalities. Continuing the above example, the pixel $(x_1, y_1)$ in the images captured from the first viewpoint was determined to correspond to the pixel $(x_2, y_2)$ in the images captured from the second viewpoint, and correspondence applies to images captured using another imaging modality, such as polarization.

In some embodiments, instead of transforming the images to the same coordinate space, the locations of the correspondences are transformed to the coordinate spaces of the other cameras of the camera array, based on the known intrinsic and extrinsic parameters of the calibrated cameras in the camera array.

Figure 7:
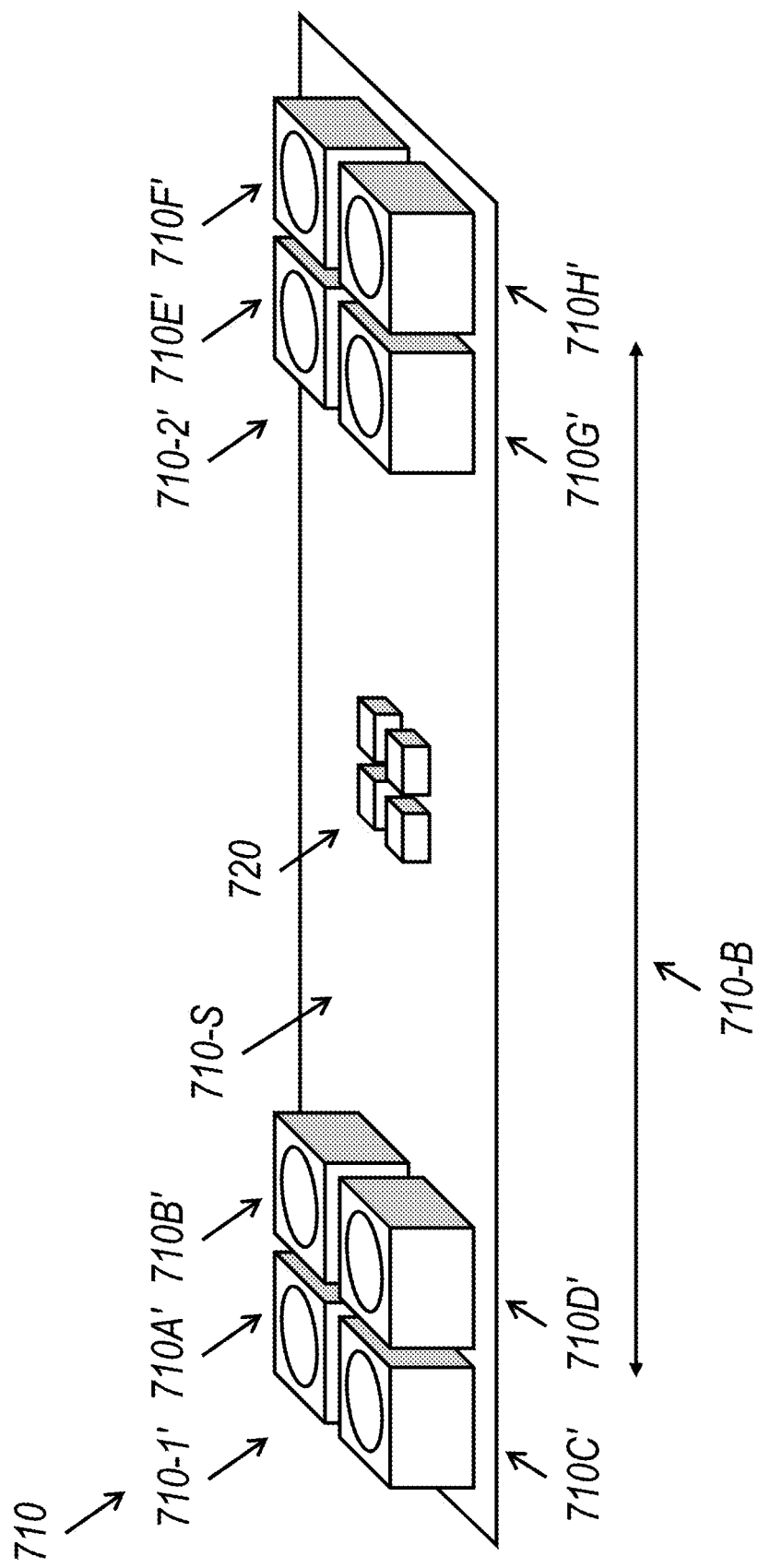
FIG. 7 is a perspective view of a stereo camera array system including a light projector system according to one embodiment of the present disclosure.

Some aspects of embodiments of the present disclosure further relate to stereo camera array systems with light projectors. Light projectors such as those described herein can be combined with any and all of the embodiments described herein to further improve the performance of the stereo camera array systems, as described in more detail below. FIG. 7 is a perspective view of a stereo camera array system 710 including a light projector system 720 configured to illuminate at least a portion of the scene within the fields of view of the cameras of the stereo camera array system 710 according to one embodiment of the present disclosure. In the particular embodiment shown in FIG. 7 includes two camera arrays: a first camera array 710-1' including cameras 710A', 710B', 710C', and 710D' and a second camera array 710-2' including cameras 710E', 710F', 710G', and 710H', with the light projector system 720 located between the two camera arrays. However, embodiments of the present disclosure are not limited thereto and may include systems with three or more camera arrays and where the light projector system 720 is located in a different place relative to the camera arrays (e.g., equidistant to the different camera arrays, closer to one or more camera arrays than other camera arrays, spaced away from the baseline 710-B connecting the camera arrays, etc.). The camera arrays and the light projector system 720 are all shown as being mounted on a same rigid support structure 710-S to keep the respective poses substantially fixed.

In various embodiments, the light projection system 720 may be implemented using a variety of different light emitting devices, such as a light emitting diode (LED), a diode laser, an electric arc lamp, and the like. For the sake of illustration, FIG. 7 depicts the light projection system 720 as including a 2×2 grid of four LEDs. In some embodiments, the LEDs are configured to emit structured light or light having a pattern such as a dot pattern (e.g., an LED dot projector). For example, a filter, one or more lenses, or other optical device may be placed in front of the light source to generate a particular pattern.

Some embodiments of the present disclosure relate to the particular case where each of the camera arrays includes a near-infrared camera without a polarization filter as a viewpoint independent camera (the remaining cameras may be, for example, visible light cameras with polarization filters at different angles of linear polarization) and where the light projection system includes a projector configured to emit light in a portion of the spectrum that is detectable by the viewpoint-independent camera and not detectable by the viewpoint dependent cameras. This arrangement may be referred to herein as "polarized active stereo." For example, a LED projector operating at a wavelength of 950 nm would emit light only at approximately 950 nm, which is detectable by a near-infrared camera but not by the visible light cameras. As such, the LED projector provides supplemental illumination to the scene (e.g., in the form of a pattern such as gray codes or dots, or as fill light without a pattern), thereby improving the quality of the images captured by the viewpoint-independent camera and the detection of correspondences based on those images, without interfering with the detection of signals in the other modalities used by the other cameras of the array (such as visible light polarization cameras).

Some aspects of embodiments of the present disclosure relate to the particular case of where each stereo pair of a given imaging modality in the camera array is associated with a corresponding synchronized fill flash provided by a corresponding light projector of the projection system 720 in a manner detectable by the corresponding given imaging modality (e.g., either in a specific wavelength or associated with a particular polarizing filter, such as polarization cameras having polarizing filters at a same angle of linear polarization). In these embodiments, the processing circuit 100 controls the projection system 720 to emit or supply the fill flash in synchronization with the capture of images by the corresponding cameras. In this arrangement, different cameras will see different flashes, allowing the whole stereo camera array system to capture the objects from multiple viewpoints with different lighting. This additional lighting provides additional information for computing the surface normals at a high resolution based on the assistance from the polarization information.

Therefore, aspects embodiments of the present disclosure relate to the reliable detection of the locations of correspondences between stereo pairs of cameras in imaging modalities where correspondences may be difficult to detect due to lack of texture or due to viewpoint-dependent characteristics of the imaging modality. In more detail, some aspects of embodiments relate to using multi-modal and/or multi-spectral stereo camera array systems, where camera arrays having a plurality of registered (or calibrated) cameras are used to capture images of a scene, and correspondences are detected using images captured by viewpoint-independent (or substantially viewpoint-independent) imaging modalities. By applying the camera parameters (e.g., intrinsic and extrinsic parameters), the locations of the correspondences can be mapped between the images captured using different modalities, thereby enabling the detection of the locations of those correspondences between stereo pairs of cameras in any imaging modality.

Some applications of embodiments of the present disclosure may also be applied to augmenting other multi-modal imaging techniques, such as by providing a multi-modal and/or multi-spectral stereo camera array system in support of a separate radar or lidar imaging system. Systems and methods for using a stereo camera array system to augment another imaging system are described, for example, in PCT Patent Application No. PCT/US20/54641, filed in the United States Patent and Trademark Office on Oct. 7, 2020, the entire disclosure of which is incorporated by reference herein.

Some applications of embodiments of the present disclosure may be applied to capturing stereo images for computing six degree of freedom (6DoF) poses of objects in a scene. See, for example, PCT Patent Application No. US2021/15926, filed in the United States Patent and Trademark Office on Jan. 29, 2021, the entire disclosure of which is incorporated by reference herein.

Accordingly, aspects of embodiments of the present disclosure relate to multi-modal camera arrays, where a camera array includes cameras of different modalities (e.g., a visible light camera and a polarization camera) and/or different spectra (e.g., visible light, near infrared, thermal, etc.) and to systems and methods for detecting or identifying correspondences between stereo pairs of camera arrays, such as identifying correspondences between portions of polarization images captured by two different polarization cameras of a stereo pair.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A stereo camera array system comprising:
a left camera array at a first viewpoint comprising:
a first left camera configured to capture images of a scene in a first, viewpoint-independent modality; and
a second left camera configured to capture images of the scene in a second, viewpoint-dependent modality that is different from the first, viewpoint-independent modality;
a right camera array at a second viewpoint spaced apart along a first baseline from the left camera array at the first viewpoint, the right camera array comprising:
a first right camera configured to capture images of the scene in the first, viewpoint-independent modality; and
a second right camera configured to capture images of the scene in the second, viewpoint-dependent modality; and
a processing circuit configured to:
generate, based on previously captured images from the left and right camera arrays, same capture parameters for the first left camera in the left camera array and for the first right camera in the right camera array, and different capture parameters for the first left camera in the left camera array and for the second left camera in the left camera array;
determine viewpoint-independent correspondences between (i) image pixels in the images in the first, viewpoint-independent modality captured by the first left camera of the left camera array and (ii) image pixels in the images in the first, viewpoint-independent modality captured by the first right camera of the right camera array;
generate, in accordance with the viewpoint-independent correspondences, an initial three-dimensional (3D) reconstruction of the scene;
determine, based on the viewpoint-independent correspondences, viewpoint-dependent correspondences between (i) image pixels in the images in the second, viewpoint-dependent modality captured by the second left camera of the left camera array and (ii) image pixels in the images in the second, viewpoint-dependent modality captured by the second right camera of the right camera array;
compute surface normals of the scene based on per-pixel polarization cues for (i) the image pixels in the images in the second, viewpoint-dependent modality captured by the second left camera of the left camera array and (ii) the image pixels in the images in the second, viewpoint-dependent modality captured by the second right camera of the right camera array; and
refine, using the computed surface normals of the scene, the initial 3D reconstruction of the scene to generate a refined 3D reconstruction of the scene.

2. The stereo camera array system of claim 1, wherein the second left camera of the left camera array comprises a linear polarization filter at a first angle of linear polarization, wherein the left camera array further comprises:
a third left camera comprising a linear polarization filter at a second angle of linear polarization; and
a fourth left camera comprising a linear polarization filter at a third angle of linear polarization,
wherein the second right camera of the right camera array comprises a linear polarization filter at the first angle of linear polarization, and
wherein the second camera array further comprises:
a third right camera comprising a linear polarization filter at the second angle of linear polarization; and
a fourth right camera comprising a linear polarization filter at the third angle of linear polarization.

3. The stereo camera array system of claim 2, wherein the left camera array further comprises:
a fifth left camera comprising a linear polarization filter at a fourth angle of linear polarization, and
wherein the right camera array further comprises:

a fifth right camera comprising a linear polarization filter at the fourth angle of linear polarization.

4. The stereo camera array system of claim 1, wherein the first, viewpoint-independent modality is:
  non-polarized visible;
  non-polarized near-infrared;
  non-polarized thermal;
  non-polarized ultraviolet;
  lidar; or
  radar.

5. The stereo camera array system of claim 1, wherein the second, viewpoint-dependent modality different from the first, viewpoint-independent modality is:
  polarized visible;
  polarized near-infrared;
  polarized thermal; or
  polarized ultraviolet.

6. The stereo camera array system of claim 2, further comprising:
  an upper camera array spaced apart from the left camera array along a second baseline different from the first baseline, the upper camera array comprising:
    a first upper camera configured to capture images in the first, viewpoint-independent modality; and
    a second upper camera configured to capture images in the second, viewpoint-dependent modality,
  wherein the second upper camera of the upper camera array comprises a linear polarization filter at the first angle of linear polarization, and
  wherein the upper camera array further comprises:
    a third upper camera comprising a linear polarization filter at the second angle of linear polarization; and
    a fourth upper camera comprising a linear polarization filter at the third angle of linear polarization.

7. The stereo camera array system of claim 1, further comprising:
  an upper camera array spaced apart from the first camera array along a second baseline different from the first baseline, the upper camera array comprising:
    a first upper camera configured to capture images in the first, viewpoint-independent modality; and
    a second upper camera configured to capture images in the second, viewpoint-dependent modality.

8. The stereo camera array system of claim 1, wherein the processing circuit is further configured to:
  control the left camera array and the right camera array to capture images concurrently;
  receive a first plurality of images from the left camera array, the first plurality of images comprising:
    a first image in the first, viewpoint-independent modality from the first left camera of the left camera array; and
    a second image in the second, viewpoint-dependent modality from the second left camera of the left camera array; and
  receive a second plurality of images from the right camera array, the second plurality of images comprising:
    a first image in the first, viewpoint-independent modality from the first right camera of the right camera array; and
    a second image in the second, viewpoint-dependent modality from the second right camera of the right camera array.

9. The stereo camera array system of claim 8, wherein the processing circuit is further configured to:
  fuse the first plurality of images received from the left camera array;
  fuse the second plurality of images received from the right camera array;
  compute a plurality of correspondences between:
    the first image of the first plurality of images; and
    the first image of the second plurality of images; and
  identify a plurality of locations of the correspondences in:
    the second image of the first plurality of images; and
    the second image of the second plurality of images.

10. The stereo camera array system of claim 8, wherein the processing circuit is further configured to:
  control the first camera array and the second camera array in accordance with:
    a plurality of first capture parameters controlling the first left camera of the left camera array;
    a plurality of second capture parameters controlling the second left camera of the left camera array;
    a plurality of third capture parameters controlling the first right camera of the right camera array; and
    a plurality of fourth capture parameters controlling the second right camera of the right camera array,
    wherein the first capture parameters, the second capture parameters, the third capture parameters, and the fourth capture parameters are independently controlled in accordance with a joint evaluation of a scene based on previously captured images from:
      the first left camera of the left camera array;
      the second left camera of the left camera array;
      the first right camera of the right camera array; and
      the second right camera of the right camera array.

11. The stereo camera array system of claim 10, wherein the information comprises images previously captured by the first left camera of the left camera array, the second left camera of the left camera array, the first right camera of the right camera array, and the second right camera of the right camera array.

12. The stereo camera array system of claim 1, further comprising a light projection system.

13. The stereo camera array system of claim 12, wherein the light projection system comprises a first light projector configured to emit light detectable in the first, viewpoint-independent modality and not detectable in the second, viewpoint-dependent modality.

14. The stereo camera array system of claim 13, wherein the light projection system further comprises a second light projector configured to emit light detectable in the second, viewpoint-dependent modality and not detectable in the first, viewpoint-independent modality.

15. The stereo camera array system of claim 12, wherein the light projection system comprises:
  a first light projector configured to emit light detectable in the first, viewpoint-independent modality; and
  a second light projector configured to emit light detectable in the second, viewpoint-dependent modality, and
  wherein the stereo camera array system further comprises a processing circuit configured to;
    synchronize emitting light by the first light projector with capturing images by the first left camera of the left camera array and the first right camera of the right camera array; and
    synchronize emitting light by the second light projector with capturing images by the second left camera of the left camera array and the second right camera of the right camera array.

16. A method for capturing stereo images comprising:
  controlling, by a processing circuit, a stereo camera array system to capture a plurality of images, the stereo camera array system comprising:

a left camera array at a first viewpoint comprising:
   a first left camera configured to capture images of a scene in a first, viewpoint-independent modality; and
   a second left camera configured to capture images of the scene in a second, viewpoint-dependent modality that is different from the first, viewpoint-independent modality; and
a right camera array at a second viewpoint spaced apart along a first baseline from the left camera array at the first viewpoint, the right camera array comprising:
   a first right camera configured to capture images of the scene in the first, viewpoint-independent modality; and
   a second right camera configured to capture images of the scene in the second, viewpoint-dependent modality,
the plurality of images comprising:
   a first plurality of images captured by the left camera array; and
   a second plurality of images captured by the right camera array; and
detecting, by the processing circuit, correspondences between the first plurality of images and the second plurality of images, the detecting comprising:
   generating, based on previously captured images from the left and right camera arrays, same capture parameters for the first left camera in the left camera array and for the first right camera in the right camera array, and different capture parameters for the first left camera in the left camera array and for the second left camera in the left camera array;
   determining viewpoint-independent correspondences between (i) image pixels in the images in the first, viewpoint-independent modality captured by the first left camera of the left camera array and (ii) image pixels in the images in the first, viewpoint-independent modality captured by the first right camera of the right camera array;
   generating, in accordance with the viewpoint-independent correspondences, an initial three-dimensional (3D) reconstruction of the scene;
   determining, based on the viewpoint-independent correspondences, viewpoint-dependent correspondences between (i) image pixels in the images in the second, viewpoint-dependent modality captured by the second left camera of the left camera array and (ii) image pixels in the images in the second, viewpoint-dependent modality captured by the second right camera of the right camera array;
   computing surface normals of the scene based on per-pixel polarization cues for (i) the image pixels in the images in the second, viewpoint-dependent modality captured by the second left camera of the left camera array and (ii) the image pixels in the images in the second, viewpoint-dependent modality captured by the second right camera of the right camera array; and
   refining, using the computed surface normals of the scene, the initial 3D reconstruction of the scene to generate a refined 3D reconstruction of the scene.

17. The method of claim 16, further comprising:
fusing the first plurality of images received from the left camera array; and
fusing the second plurality of images received from the right camera array.

18. The method of claim 17, wherein the first plurality of images comprises:
   a first image captured in the first, viewpoint-independent modality from the first viewpoint; and
   a second image captured in the second, viewpoint-dependent modality from the first viewpoint,
wherein the second plurality of images comprises:
   a third image captured in the first, viewpoint-independent modality from the second viewpoint;
   a fourth image captured in the second, viewpoint-dependent modality from the second viewpoint, and
wherein the method further comprises detecting correspondences by detecting correspondences between:
   the first image and the third image; and
   the second image and the fourth image.

19. The method of claim 18, wherein the first image and the second image are mapped to a first common coordinate space,
   wherein the third image and the fourth image are mapped to a second common coordinate space, and
   wherein the correspondences between the second image and the fourth image are detected by:
      identifying locations of a plurality of correspondences detected between the first image in the first common coordinate space and the third image in the second common coordinate space; and
      mapping the locations of the correspondences to the second image in the first common coordinate space and the fourth image in the second common coordinate space.

20. The method of claim 16, further comprising controlling the first camera array and the second camera array in accordance with:
   a plurality of first capture parameters controlling the first left camera of the left camera array;
   a plurality of second capture parameters controlling the second left camera of the left camera array;
   a plurality of third capture parameters controlling the first right camera of the right camera array; and
   a plurality of fourth capture parameters controlling the second right camera of the right camera array,
   wherein the first capture parameters, the second capture parameters, the third capture parameters, and the fourth capture parameters are independently controlled in accordance with a joint evaluation of a scene based on previously captured images from:
      the first left camera of the left camera array;
      the second left camera of the left camera array;
      the first right camera of the right camera array; and
      the right camera of the right camera array.

21. The method of claim 20, wherein the information comprises images previously captured by the first left camera of the left camera array, the second left camera of the left camera array, the first right camera of the right camera array, and the second right camera of the right camera array.

22. The method of claim 16, wherein the second left camera of the left camera array comprises a linear polarization filter at a first angle of linear polarization,
   wherein the left camera array further comprises:
      a third left camera comprising a linear polarization filter at a second angle of linear polarization; and
      a fourth left camera comprising a linear polarization filter at a third angle of linear polarization, wherein the second right camera of the right camera array comprises a linear polarization filter at the first angle of linear polarization, and wherein the right camera array further comprises:
- a third right camera comprising a linear polarization filter at the second angle of linear polarization; and
- a fourth right camera comprising a linear polarization filter at the third angle of linear polarization.

23. The method of claim 22, wherein the left camera array further comprises:
- a fifth left camera comprising a linear polarization filter at a fourth angle of linear polarization, and wherein the right camera array further comprises:
- a fifth right camera comprising a linear polarization filter at the fourth angle of linear polarization.

24. The method of claim 22, wherein the stereo camera array system further comprises:
- an upper camera array spaced apart from the first camera array along a second baseline different from the first baseline, the upper camera array comprising:
  - a first upper camera configured to capture images in the first, viewpoint-independent modality; and
  - a second upper camera configured to capture images in the second, viewpoint-dependent modality.

25. The method of claim 24, wherein the second upper camera of the upper camera array comprises a linear polarization filter at the first angle of linear polarization, and wherein the upper camera array further comprises:
- a third upper camera comprising a linear polarization filter at the second angle of linear polarization; and
- a fourth upper camera comprising a linear polarization filter at the third angle of linear polarization.

26. The method of claim 22, wherein the first, viewpoint-independent modality is:
- non-polarized visible;
- non-polarized near-infrared;
- non-polarized thermal;
- non-polarized ultraviolet;
- lidar; or
- radar.

27. The method of claim 26, wherein the second, viewpoint-dependent modality different from the first, viewpoint-independent modality is:
- polarized visible;
- polarized near-infrared;
- polarized thermal; or
- polarized ultraviolet.

28. The method of claim 16, wherein the stereo array camera system further comprise a light projection system.

29. The method of claim 28, wherein the light projection system comprises a first light projector configured to emit light detectable in the first, viewpoint-independent modality and not detectable in the second, viewpoint-dependent modality.

30. The method of claim 29, wherein the light projection system further comprises a second light projector configured to emit light detectable in the second, viewpoint-dependent modality and not detectable in the first, viewpoint-independent modality.

31. The method of claim 28, wherein the light projection system comprises:
- a first light projector configured to emit light detectable in the first, viewpoint-independent modality; and
- a second light projector configured to emit light detectable in the second, viewpoint-dependent modality, and wherein the method further comprises:
- synchronizing emitting light by the first light projector with capturing images by the first left camera of the left camera array and the first right camera of the right camera array; and
- synchronizing emitting light by the second light projector with capturing images by the second left camera of the left camera array and the second right camera of the right camera array.

32. The stereo camera array system of claim 1, wherein determining viewpoint-dependent correspondences comprises:
- mapping (i) respective locations of the image pixels in the images in the second, viewpoint-dependent modality captured by the second left camera of the left camera array and (ii) respective locations of the image pixels in the images in the second, viewpoint-dependent modality captured by the second right camera of the right camera array to a same coordinate space.

* * * * *